United States Patent
Tsukishima et al.

(10) Patent No.: US 6,535,773 B1
(45) Date of Patent: Mar. 18, 2003

(54) DEVICE AND METHOD FOR CALCULATING REQUIRED QUANTITY OF MATERIAL

(75) Inventors: Takahiro Tsukishima, Zushi (JP); Masahiro Sato, Yokohama (JP); Masahito Takata, Yokohama (JP); Sachiko Yoshida, Yokohama (JP); Fumio Yokoyama, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/381,099

(22) PCT Filed: Apr. 17, 1998

(86) PCT No.: PCT/JP98/01774
§ 371 (c)(1),
(2), (4) Date: Dec. 3, 1999

(87) PCT Pub. No.: WO98/48331
PCT Pub. Date: Oct. 29, 1998

(30) Foreign Application Priority Data

Apr. 23, 1997 (JP) ............................................. 9-105743

(51) Int. Cl.[7] ............................................. G06F 19/00
(52) U.S. Cl. ..................................... 700/99; 700/106
(58) Field of Search ............................ 700/95–102, 106; 705/8; 708/1–9, 290, 446, 490, 524, 525

(56) References Cited

U.S. PATENT DOCUMENTS

| | | | | |
|---|---|---|---|---|
| 4,646,238 A | * | 2/1987 | Carlson, Jr. et al. | 700/95 |
| 5,630,070 A | * | 5/1997 | Dietrich et al. | 705/8 |
| 5,764,519 A | * | 6/1998 | Tsukishima et al. | 700/106 |
| 5,787,000 A | * | 7/1998 | Lilly et al. | 700/95 |
| 5,796,614 A | * | 8/1998 | Yamada | 700/106 |
| 5,930,763 A | * | 7/1999 | Kaneko et al. | 705/8 |
| 5,943,484 A | * | 8/1999 | Milne et al. | 700/100 |
| 6,122,560 A | * | 9/2000 | Tsukishima et al. | 700/106 |

FOREIGN PATENT DOCUMENTS

| | | | |
|---|---|---|---|
| JP | 7-044505 | * | 2/1995 |
| JP | 8-249377 | * | 9/1996 |
| JP | 8-320850 | * | 12/1996 |
| JP | 10-015785 | * | 1/1998 |
| WO | 9401826 | | 1/1994 |
| WO | 96/29666 | * | 9/1996 |

* cited by examiner

Primary Examiner—Maria N. Von Buhr
(74) Attorney, Agent, or Firm—Antonelli, Terry, Stout & Kraus, LLP

(57) ABSTRACT

A material/quantity requirements arithmetic determination system which can ensure enhanced processing speed by uniformizing a load occurring in execution of arithmetic processings and suppressing occurrence of overhead to a possible minimum. The material/quantity requirements arithmetic determination system includes a plurality of material/quantity requirements planning (MRP) arithmetic units disposed in parallel for determining arithmetically types of items, quantities thereof and delivery-appointed terms thereof which are required for manufacturing a predetermined article on the basis of a production schedule of the article. A given one MRP arithmetic unit determines arithmetically a net required quantity of a given item to thereby supply the net required quantity as determined to the other MRP arithmetic units wherein the MRP arithmetic units execute part-based expansion arithmetics in parallel, respectively, for allocated ones of plural child-items which constitute the item on the basis of the net required quantity of the item.

8 Claims, 18 Drawing Sheets

BLOCK DIAGRAM OF GENERAL SYSTEM CONFIGURATION

CONCEPT OF PRESENT INVENTION

DISTRIBUTED MEMORY TYPE PARALLEL COMPUTER

PE : Processor Element

BASIC CONFIGURATION OF DISTRIBUTED MEMORY TYPE MRP SYSTEM

FLOW CHART CONTROL PROCESS

DATA STRUCTURE OF ITEM CELL

READING OF PARTS STRUCTURE TABLE (FOR ITEM C)

FLOW CHART OF MRP ARITHMETIC PROCESSING

DATA STRUCTURES OF JOB COUNTER AND JOB QUEUE

FLOW CHART OF PART-BASED EXPANSION ARITHMETIC PROCESSING

FLOW CHART OF CHILD-ITEM-BASED EXPANSION PROCESSING

FLOW CHART OF NET REQUIRED QUANTITY CARRIER WRITE PROCESSING

DATA STRUCTURE OF NET REQUIRED QUANTITY CARRIER

FLOW CHART OF CARRY_MSG CORRESPONDING PROCESSING

PARTS EXPLODED DIAGRAM AND LOW LEVEL CODES

PROBLEM OF PRIOR ART SYSTEM

DEVICE AND METHOD FOR CALCULATING REQUIRED QUANTITY OF MATERIAL

TECHNICAL FIELD

The present invention relates to a material/quantity requirements arithmetic determination system for determining arithmetically a material/quantity requirements schedule in order to determine various types of parts and raw materials required for manufacturing an article in accordance with a given production schedule.

BACKGROUND ART

In conjunction with planning of a production schedule for a given article to be manufactured such as an electric motor, there is known a required material/quantity planning (also known as the material requirements planning, hereinafter referred to also as "MRP" in short) as one of methods for automatically determining arithmetically the types or species of parts required for manufacturing an article to be manufactured in accordance with a schedule, time points at which component parts of the article are required and the numbers thereof.

The MRP and the conventional MRP arithmetic scheme is disclosed, for example, in "ZUSETU MRP YOUGO 500 SEN (Selected 500 MRP terms with illustrations in English)" (published by Nikkan Kogyo Shinbun Co. in 1983) and others. In the following, the conventional MRP arithmetic scheme will be reviewed in brief.

For arithmetically determining an MRP, arrangement/preparation schedule is established on the basis of a planned production schedule of an article level (also known as the master production schedule, hereinafter referred to also as MPS in short) for purchasing or manufacturing required things (items) at required times(within delivery-appointed terms) by required amounts (required quantities) concerning parts, raw materials or the like. This arithmetic procedure requires generally three types of information mentioned below.

(1) MPS

In general, the term "master production schedule or MPS" means a production schedule and a standard production schedule of an item (article to be manufactured) which occupies a top level in a parts-exploded diagram.

(2) Parts Table

The term "parts table" means a list table based on two types of master data, i.e., data unique to items, being referred to as "items table", and data indicating interrelations among items, e.g. between an article to be manufactured and component parts, between component parts and component parts, between component parts and raw materials, and so forth, being referred to as "parts arrangement table".

(3) Inventory/Order Balance

The term "inventory/order balance" means inventory and number of items being in process at a current time point or an expected delivery-appointed term and an expected number of items already ordered and expected to be delivered or received in the future (order balance information).

On the basis of the information (1) to (3) mentioned above, the MRP arithmetic procedure is so designed as to execute five arithmetic operations mentioned below f or each of the items.

(1) Total Required Quantity Arithmetic

Required quantity data concerning a relevant item is fetched to thereby determine arithmetically a total required quantity thereof for a time period by taking into account the quantities required on a period-by-period basis. In this conjunction, the following description will be made on the presumption that the period mentioned above is set to one day and thus the schedule is planned on a day-by-day basis.

(2) Net Required Quantity Arithmetic

On the basis of the total required quantity determined arithmetically, the net required quantity demanded on a day-by-day basis is determined arithmetically by taking into account the inventory and the order balance.

(3) Lot Arrangement

On the basis of the net required quantity determined on the day-by-day basis, the number/quantity most appropriate for the arrangement or preparation is determined by taking into consideration a lot size preset for the relevant item.

(4) Lead Time Arithmetic

From the delivery-appointed term of the item of the number/quantity determined through the lot arrangement arithmetic, a lead time is subtracted to determine the relevant order date or outset date to thereby prepare the order.

(5) Expansion of Children-items

The order as prepared is expanded down to the items of the lowest rank by making reference to the parts table. More specifically, the demanded quantity is arithmetically determined for each of child-items on the basis of the child-items and the numbers thereof contained in the data concerning the structure of an article to be manufactured with the date immediately preceding to the order outset date being set as the demand-issued date, whereon the required quantities of the individual child-items are written in the required quantity data of each items.

In the following, the arithmetics (1) to (5) described above will be referred to as "part-based expansion arithmetics".

Through the MRP arithmetic procedure, part-based expansion arithmetic is executed for all the items required for manufacturing the articles all preset in the MPS. It is however noted that the arithmetics for the individual items cannot be executed until the part-based expansion arithmetic for the relevant parent-item of the above-mentioned items has been completed for determining the total required quantity as demanded. For controlling such arithmetic execution sequence, low level codes are introduced in the conventional MRP arithmetic procedure.

At this juncture, description will be made of the low level codes in brief, As is illustrated in FIG. 17, on the basis of a parts-exploded diagram of a given article to be manufactured, it is possible to impart level codes to the parts, respectively, in dependence on which of the hierarchical levels or ranks each of the items belongs to in view of the hierarchical parts disposition. Because some of the items may have a plurality of level codes allocated, the level code of the hierarchically lowest level or rank is defined as the low level code. In this conjunction, with the low level or rank, it is contemplated to mean the level as viewed in the direction toward more basic item on the parts-exploded diagram, i.e., when the hierarchical level becomes lower, the corresponding part represents more basic item.

The low level codes of the individual items can be established by retrieving all the items contained in the parts table in precedence to the start of execution of the MRP arithmetic procedure. The low level codes are contained in the items data as the information specific or unique to the items.

By virtue of setting the low level codes in this manner, it can be ensured that so far as the part-based expansion arithmetics for the items ranking hierarchically higher than a given level inclusive thereof has been completed, the arithmetics for all the items belonging to the succeeding level can be executed, Such being the circumstances, in the conventional MRP arithmetic procedure, the sequence of the part-based expansion arithmetics for the individual items is determined on a level-by-level basis by making use of the low level codes.

More specifically, processings are executed progressively through the procedure described below.

(1) Reading of MPS

A required quantity read out from the MPS is allocated to an item of the article level appearing in the MPS. Further, at that time, the relevant item name or identifier is entered in a queue of level 0.

(2) Start of Arithmetic Operation from the Queue of Level 0.

At the time point when the MPS reading operations have all been completed, one item identifier is extracted from the queue of level 0, whereon the part-based expansion arithmetic is performed for that item, upon completion of which the succeeding item identifier is extracted from the queue. In this conjunction, upon required quantity expansion in the course of the part-based expansion arithmetic operation, the child-item identifiers are entered in the queues of low level codes for the relevant child-items except for the case where the child-item identifiers have already been entered in the queue.

(3) Expansion on a Level-by-level Basis

When the queue of a certain level becomes empty or vacant, one item identifier is taken out from the queue of the immediately succeeding lower level, whereon the part-based expansion arithmetic is performed for the item as taken out. The item identifiers are taken out from the queue of that level until the queue has become vacant, to thereby execute repetitively the part-based expansion arithmetic. As in the case of the process (2) described above, for the required quantity expansion arithmetic included in the part-based expansion arithmetic, the child-item identifier is placed in the low level code queue of that child-item. However, nothing is done when it has already been placed in the queue.

(4) End of MRP Arithmetic Procedure

The arithmetic procedure comes to an end when the queues of all levels become vacant.

In conjunction with the technologies described above, the applicants of the present application has continued the study for speeding up the processing by executing the conventional MRP arithmetic procedures in parallel, the results of which are disclosed, for example, in PCT Publication No. 9629666 entitled "PARALLEL PROCESSING SCHEME AND APPARATUS FOR MATERIAL/QUANTITY REQUIREMENTS ARITHMETIC USING LOW LEVEL CODES With this technology, the MRP arithmetic procedure is realized through cooperation of a single controller and a plurality of data processing units. Each of the data processing units is designed to execute the part-based expansion arithmetic for each of the allocated items. In that case, when the part-based expansion arithmetic for a given item has been completed with the required quantity of the relevant child-item having been arithmetically determined and when the child-item is to be allocated to the data processing unit differing from that for the parent-item relevant to that child-item, the required quantity of that child-item is transferred to the different data processing unit mentioned just above. While performing such data transfer as mentioned above, the part-based expansion arithmetics are executed for the individual items in parallel as a whole, whereby high-speed execution of the MRP arithmetic procedure can be realized.

By way of example, reference is made to FIG. 18 which shows schematically in a block diagram the configuration of the system disclosed in the above-mentioned publication. When child-items of an item A are represented by items B to G, respectively, and when the items A, B and C are allocated to an MRP arithmetic apparatus 1 while the items D and E are allocated to an MRP arithmetic apparatus 2 with the items F and G being allocated to an MRP arithmetic apparatus 3, there arise problems described below when the parallel processing method of the conventional MRP arithmetic procedure is adopted.

i # Pj: Degradation of Balance in Load of Calculation

It is assumed that the part-based expansion arithmetic for the item A is executed by the MRP arithmetic apparatus 1, as shown in FIG. 18. In the processing for expansion into child-items, the required quantities of the items B to G, respectively, have to be arithmetically determined on the basis of net required quantity data after the lot arrangement for the item A has been done. Consequently, the part-based expansion arithmetic for the item A executed by the MRP arithmetic apparatus 1 involves large load in the processing. On the other hand, processings to be executed by the MRP arithmetic apparatuses 2 and 3, respectively, are absent during execution of the arithmetic by the MRP arithmetic apparatus 1. Such unbalance of the load involved among the MRP arithmetic apparatus upon execution of the arithmetic processings will lead to lowering of the processing speed of the whole system.

i # Qj: Increase of Data Transfer Quantity

After completion of the part-based expansion arithmetic of the item A, a number of required quantity data has to be transferred to each of the MRP arithmetic apparatuses 2 and 3 from the MRP arithmetic apparatus 1, which number corresponding to the number of items allocated to each of the MRP arithmetic apparatuses 2 and 3. The processing time involved in the data transfer means overhead making appearance in the parallel executions of the MRP arithmetics, and thus the processing time of the whole system increases as the quantity of data to be transferred increases.

In the case of the example illustrated in FIG. 18, there exist six child-items for one item. However, in the case, for example, of a printed circuit board having electronic parts mounted thereon, there exist several ten to several hundreds of child-items f or one item. Accordingly, influence of the problems described above becomes serious in a relative sense. Thus, there arises a problem that the processing time can not be shortened to a desired extend even if the MRP arithmetics are executed in parallel.

SUMMARY OF THE INVENTION

With the present invention, it is contemplated as an object thereof to provide a material/quantity requirements arithmetic determination system which can ensure enhanced processing speed with the load occurring in execution of the arithmetic processings being uniformized while occurrence of overhead is suppressed to a possible minimum. The object of the present invention can be achieved by providing a material/quantity requirements arithmetic determination system which includes a plurality of arithmetic means for determining arithmetically types of items, quantities thereof and time points at which the items are required, respectively, for manufacturing an article, wherein a first arithmetic means of the plural arithmetic means includes a means for arithmetically determining a net required quantity of the article and a means for outputting the net required quantity determined arithmetically to other one of the plural arithmetic means, and wherein the other one of the plural arithmetic means includes a means for executing child-item-based expansion of an item allocated to that other one arithmetic means by using the net required quantity outputted from the first arithmetic means and means for arithmetically determining a required quantity of the item undergone the child-item-based expansion, whereby at least types of items, quantities thereof and time points at which the items are demanded are arithmetically determined on the basis of the required quantities of the individual items as determined arithmetically for thereby manufacturing the article being subjected to the arithmetic.

Further, the above-mentioned object can be achieved by a material/quantity requirements arithmetic determination system comprising a plurality of MRP arithmetic means for arithmetically determining at least items constituting an article to be manufactured and required quantities of the items, respectively, on the basis of a production schedule of the article, wherein arithmetic determinations of the items constituting the article are allocated to the plurality of MRP arithmetic means which are so arranged as to execute child-items-based expansion for the item(s) allocated thereto.

According to the present invention, it is possible to uniformize load among the MRP arithmetic means because the part-based expansion arithmetics are executed in parallel by the individual MRP arithmetic means for the allocated items, respectively. Furthermore, since the first MRP arithmetic means is required only to transfer the net required quantity of the item to the other MRP arithmetic means, the time required for the transfer can be reduced.

In a preferred mode for carrying out the present invention, the above-mentioned other arithmetic means includes a data holding means for storing data concerning items which the article has, an arithmetic-susceptible item extracting means for extracting child-items which are susceptible to MRP arithmetic, a child-item expanding means for executing child-item-based expansion for the allocated item on the basis of a net required quantity as given, a part-based expansion arithmetic means for receiving data concerning the child-items to thereby execute part-based expansion arithmetic for the child-items, and an arithmetic-susceptible item managing means for supplying to the bart-based expansion arithmetic means the data concerning the child-items extracted through the arithmetic-susceptible item extracting means.

In a further preferred mode for carrying out the present invention, the plurality of arithmetic means are so arranged as to execute in parallel the arithmetics concerning the items for which low level codes representative of level codes of hierarchically lowest rank among those indicating hierarchical levels to which the items constituting the article to be manufactured belong are same.

Further, the object of the present invention can be achieved by providing a material/quantity requirements arithmetic determination method for determining arithmetically types of items, quantities thereof and delivery-appointed terms thereof which are required for manufacturing a predetermined article on the basis of a production schedule of the article with the aid of a plurality of arithmetic means, wherein the method comprises a step of arithmetically determining a net required quantity of the article with first one of the plural arithmetic means, a step of outputting the net required quantity determined arithmetically to other one of the plural arithmetic means, a step of executing child-item-based expansion of an item allocated to the aforementioned other one arithmetic means with said other one arithmetic means by using the net required quantity outputted from the aforementioned first arithmetic means and a step of arithmetically determining a required quantity of the item undergone the child-item-based expansion, whereby at least types of items, quantities thereof and time points at which the items are demanded are arithmetically determined on the basis of the required quantities of the individual items as determined arithmetically, for thereby manufacturing the article being subjected to the arithmetics or alternatively by providing a computer-readable storage medium in which programs for realizing the method described above is stored.

DETAIL DESCRIPTION OF THE DRAWINGS

Figure 1:
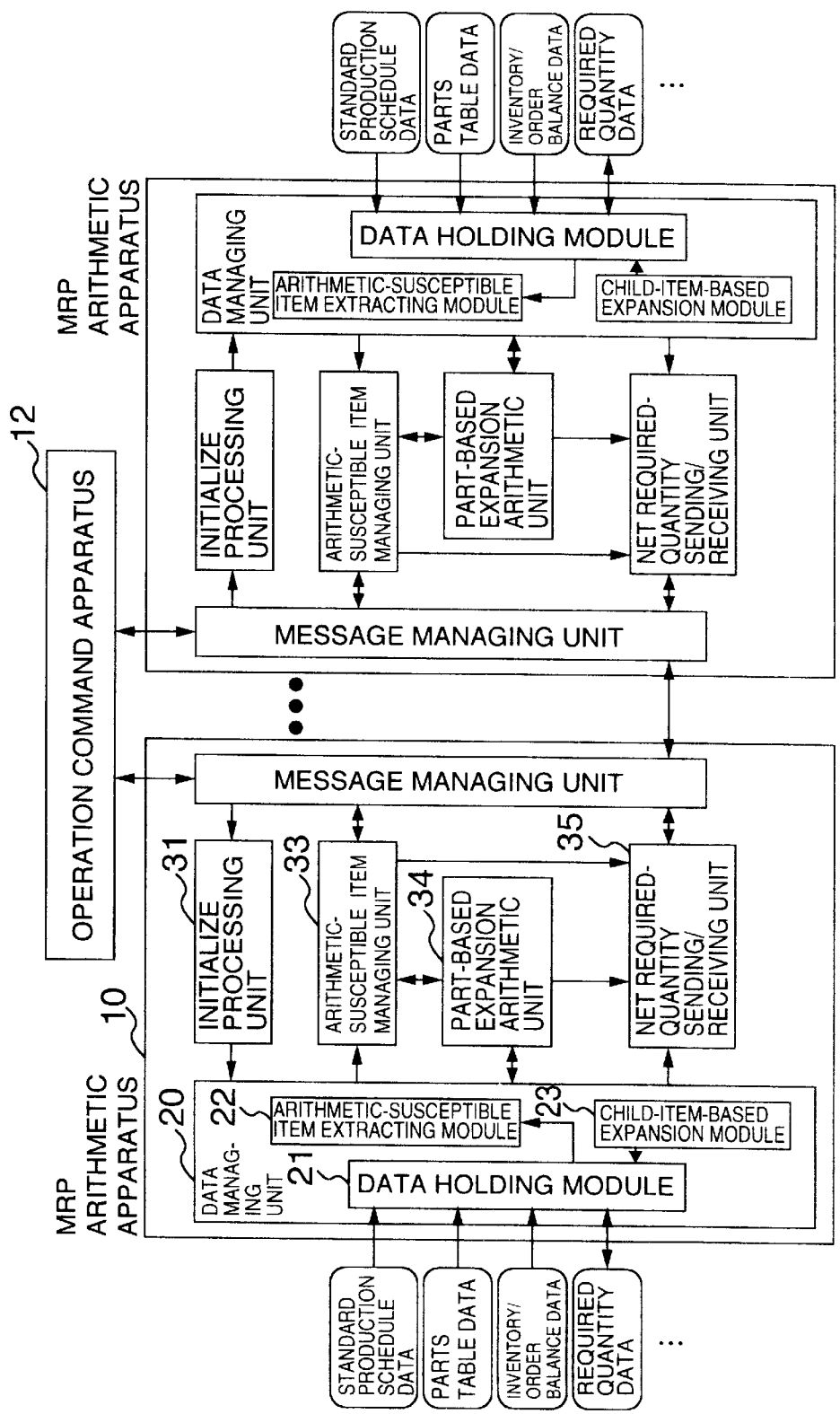
FIG. 1 is a block diagram showing a configuration of an MRP arithmetic system according to an embodiment of the present invention.

In the following, description will be made in detail of the modes for carrying out the invention or embodiments thereof by reference to the accompanying drawings. FIG. 1 is a block diagram showing a configuration of an MRP arithmetic system according to an embodiment of the present invention. As is shown in FIG. 1, the MRP arithmetic system includes a plurality of MRP arithmetic apparatuses 10-1, 10-2, . . . , and an operation command apparatus 12 for issuing commands for required operations to all the MRP arithmetic apparatuses while monitoring or managing the states of the individual MRP arithmetic apparatuses. The plural MRP arithmetic apparatuses 10-1, 10-2, . . . , are connected to the operation command apparatus 12 and additionally they are interconnected through the medium of respective message managing units 36 which will be described later on.

Each of the MRP arithmetic apparatuses 10 is comprised of a data managing unit 20 which in turn is comprised of a data holding module 21 for realizing input/output of data concerning individual items, an arithmetic-susceptible item extracting module 22 for managing data transfers among parent and child-items to thereby extract arithmetic-susceptible items, i.e., items capable of undergoing arithmetic processing, and a child-item-based expansion module 23 f or arithmetically determining required quantities of the child-items on the basis of the net required quantity of the parent-item, an initialize processing unit 31 for executing an initialize processing for the MRP arithmetic procedure, an arithmetic-susceptible item managing unit 33 for managing the items extracted by the arithmetic-susceptible item extracting module 22 to thereby load the relevant items sequentially into a part-based expansion arithmetic unit 34 while taking into account priority levels of the items, the part-based expansion arithmetic unit 34 for executing part-based expansion arithmetics f or the items, respectively, a net required-quantity sending/receiving unit 35 for executing a processing required for net required-quantity transaction among the parent and child-items, and a message managing unit 36 for managing message sending/reception. Although only one part-based expansion arithmetic unit 34 is shown in FIG. 1, there may be provided a plurality of such part-based expansion arithmetic unit.

The part-based expansion arithmetic unit 34 is designed to arithmetically determine inventory allotment, lot arrangement and lead time as parts of the MRP arithmetic procedure, while the child-item-based expansion module 23 of the data managing unit 20 is designed to arithmetically determine or calculate the required quantities of the child-items, respectively, on the basis of the net required quantity of the parent-item.

Figure 2:
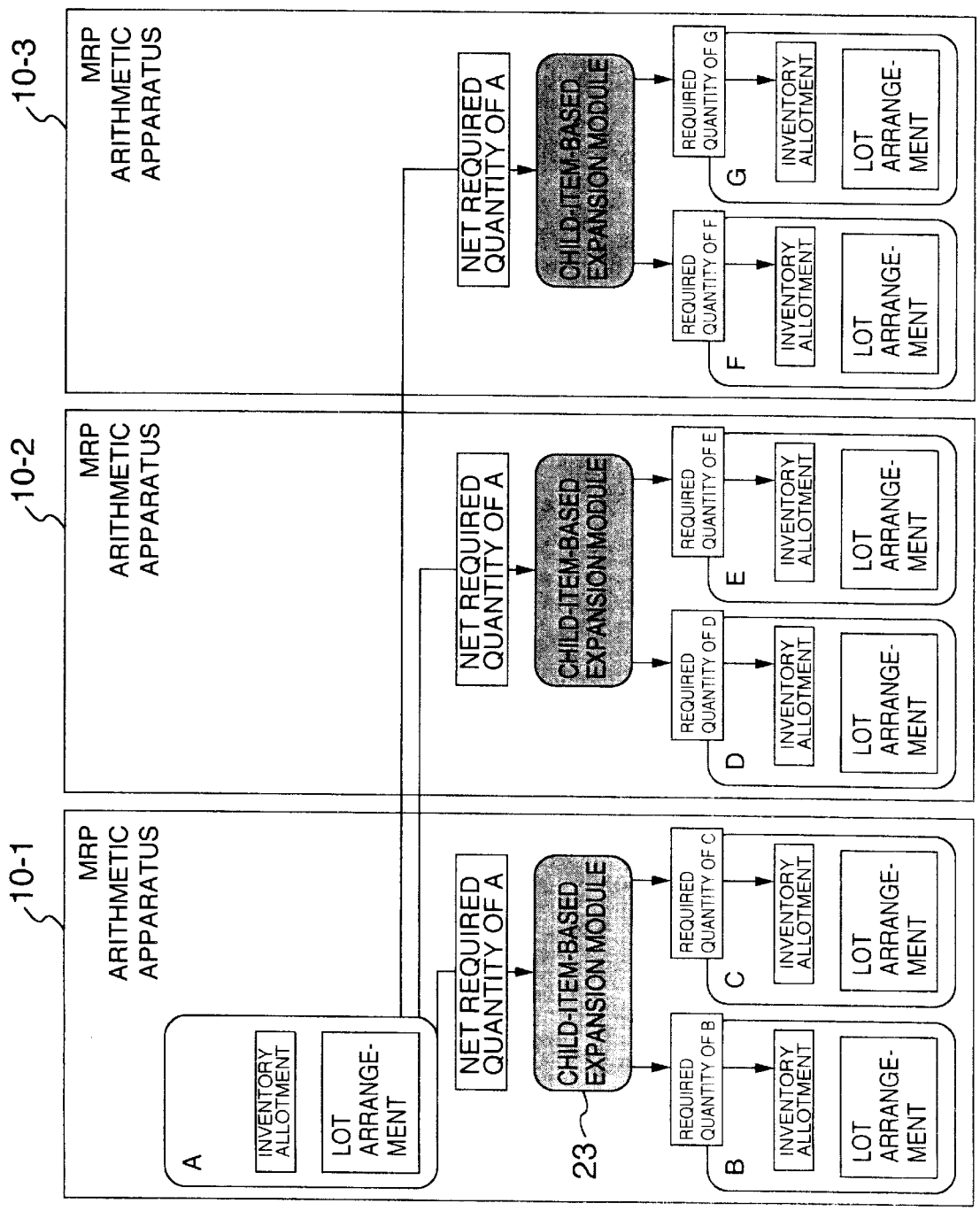
FIG. 2 is a view for illustrating schematically a general arrangement according to the present invention.
Figure 18:
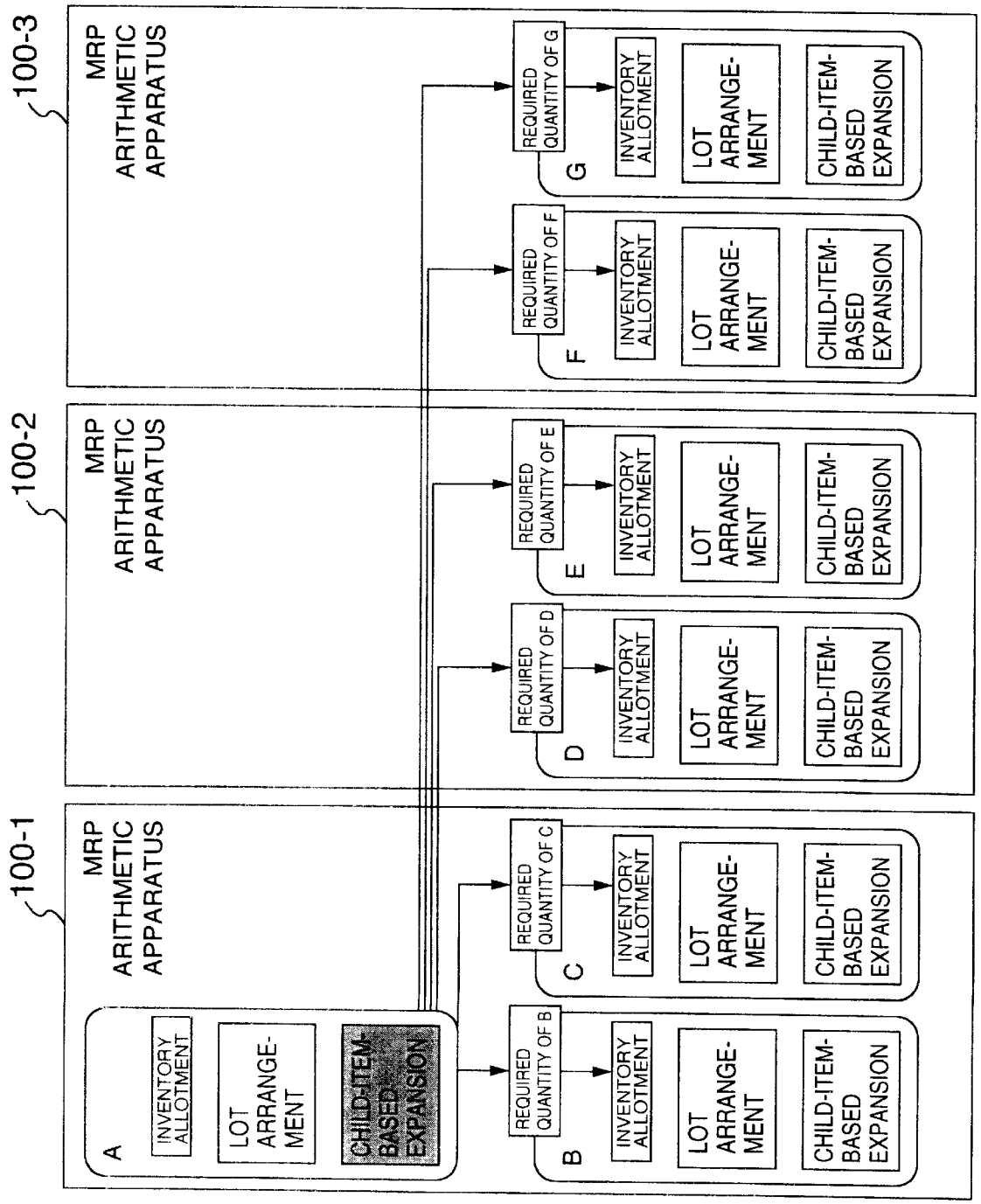
FIG. 18 is a view showing schematically a conventional MRP arithmetic system known heretofore.

At this juncture, features of the present invention will be described in brief by referring comparatively to FIG. 2 illustrating schematically and generally the concept underlying the present invention and FIG. 18. As described hereinbefore, in the conventional MRP arithmetic system, the child-item-based expansion processing for a given item is executed by the arithmetic apparatus (the MRP arithmetic apparatus 100-1 in the system shown in FIG. 18) which is destined to perform the arithmetics for the inventory allotment and the lot arrangement for the given item, whereon the required quantities of the individual child-items as determined through the child-item-based expansion processing are transferred to the other MRP arithmetic apparatuses (the MRP arithmetic apparatuses 100-2 and 100-3 in the system shown in FIG. 18) or made use of in the arithmetic apparatus itself which executed the child-item-based expansion processing. By contrast, in the MRP arithmetic system according to the present invention, the net required quantity of a given item is admitted or accepted, whereon a corresponding child-item-based expansion processing is executed by each of the MRP arithmetic apparatuses 10-1 to 10-3 on the basis of the net required quantity, as can be seen in FIG. 2. By virtue of this feature, it is sufficient for the MRP arithmetic apparatus 10-1 to transfer only the net required quantity to the other MRP arithmetic apparatuses, which means that the time taken for the data transfer can be reduced. Additionally, it is possible to ensure improved balance of the operation load among the MRP arithmetic apparatuses 10-1 to 10-3.

Figure 3:
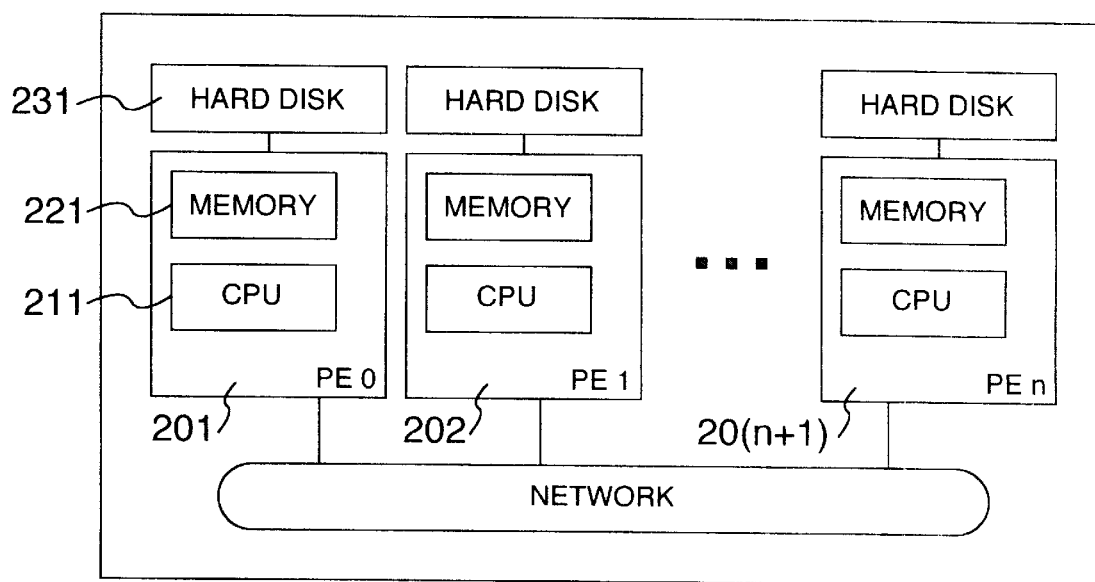
FIG. 3 is a view showing a configuration of a distributed memory type parallel computer to which the present invention can be applied.

In practical application, the MRP arithmetic system implemented in the configuration described above can be realized by a distributed memory type parallel computer shown in FIG. 3. The distributed memory type parallel computer is comprised of a plurality of processing or processor elements (also referred to as the PE) 201, 202, 20(n+1) which are mutually interconnected byway of a network. Each of the processor elements includes a CPU 211 and a memory 221. Additionally, a hard disk drive 231 is connected to each of the processor elements. Incidentally, in a hard disk drive 231 connected to the processor element PE0 (201), there is stored a program for controlling comprehensively the MRP arithmetic operations according to the instant embodiment of the invention, whereas stored in each of the processor elements PE0 to PEn (201 to 20(n+1)) are programs for executing actually the MRP arithmetics. Parenthetically, these programs need not be stored in the hard disk drive.

Figure 4:
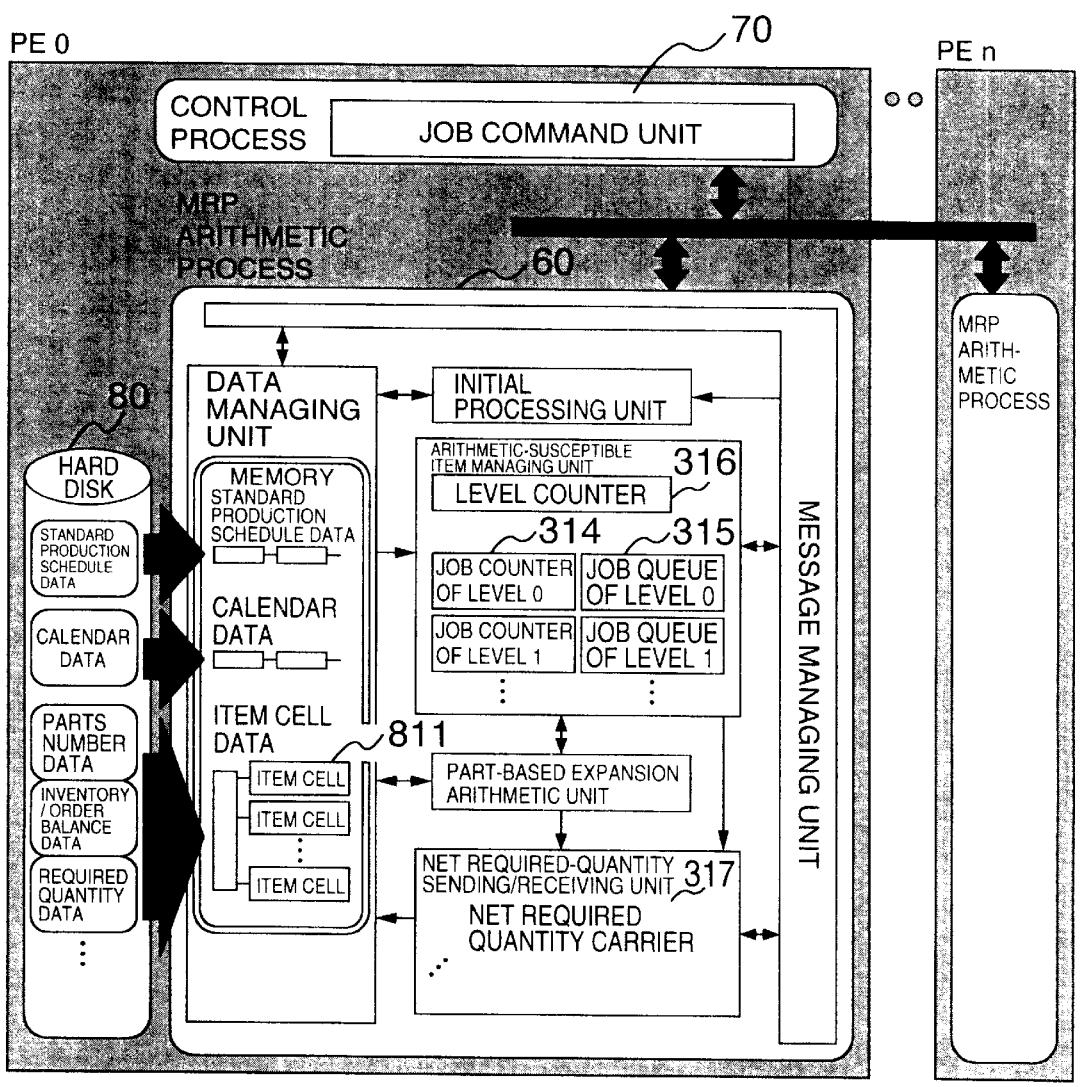
FIG. 4 is a block diagram showing a configuration of an MRP arithmetic system realized by a distributed memory type parallel computer.
Figure 5:
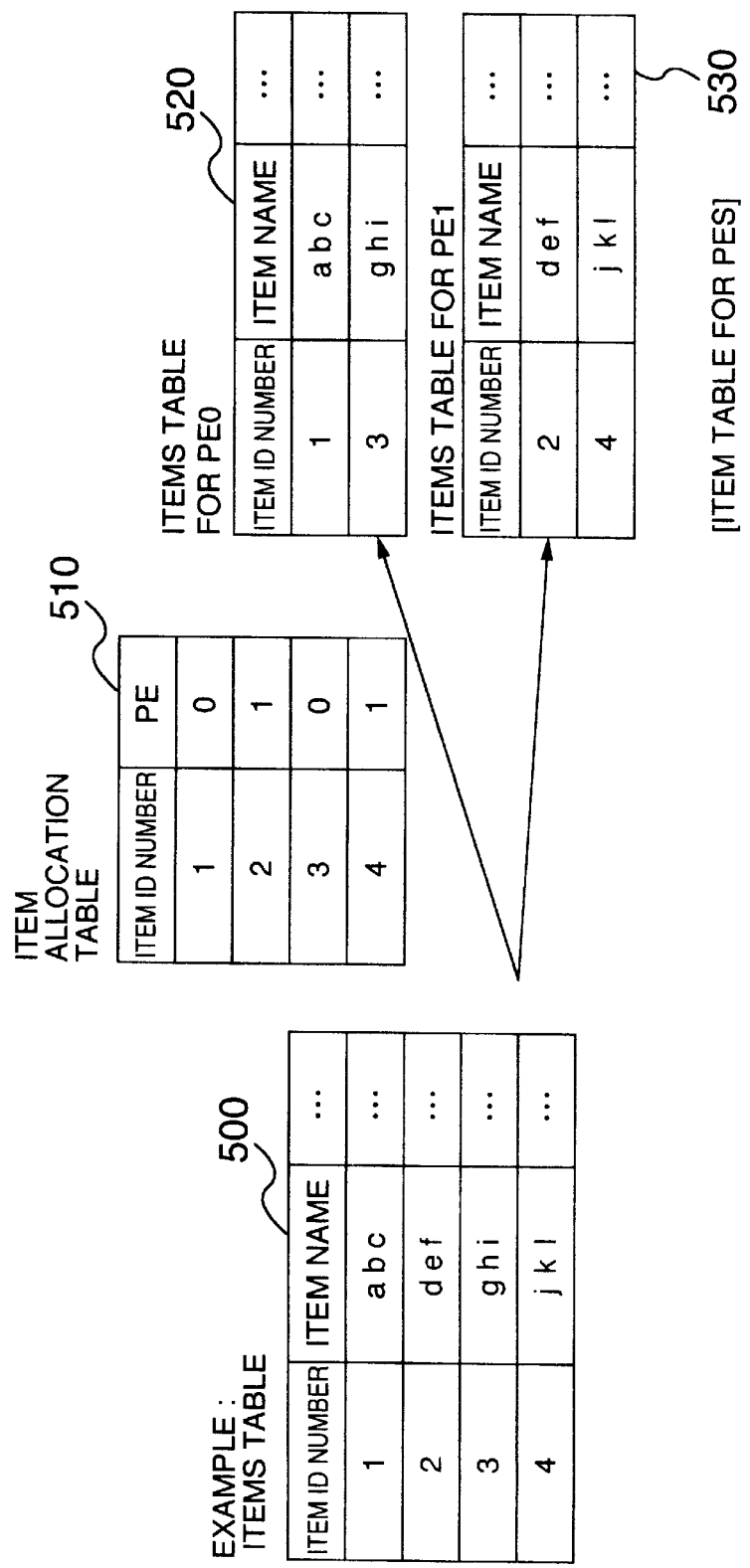
FIG. 5 is a view for illustrating an items table employed in a mode for carrying out the present invention.

By way of example, these programs may be stored in a portable storage medium such as a floppy disk, a CD-ROM or the like. In that case, the program as required may be read from the portable storage medium by meas of a portable storage medium reading unit connected to the processor element. By way of example, an MRP arithmetic process 60 and a control process 70 are executed by the CPU 211 of the processor element PE0 of the distributed memory type parallel computer, as shown in FIG. 4. In this conjunction, it is noted that by executing the MRP arithmetic process 60, the functions of the data managing unit 20, the arithmetic-susceptible item managing unit 33, the part-based expansion arithmetic unit 34, the net required-quantity sending/receiving unit 25 and the message managing unit 36 of the MRP arithmetic apparatus 10 shown in FIG. 1 can be realized, while by executing the control process 70, the function of the operation command apparatus 12 can be realized. On the other hand, the other processor elements PE1 to PEn (202 to 20(n+1)) are each so arranged that the MRP arithmetic process is executed by the CPU. By executing the respective MRP arithmetic processes, there can be realized the functions of the data managing unit 20, the initial processing unit 31, the arithmetic-susceptible item managing unit 33, the part-based expansion arithmetic unit 34, the net required-quantity sending/receiving unit 35 and the message managing unit 36 of the other MRP arithmetic apparatuses, respectively.

As is shown in FIG. 4, the control process 70 executed by the processor element PE0 is in charge of managing the states of the MRP arithmetic processes being processed by the processor elements PE0 to PEn and commanding start/end of the MRP arithmetics performed through the individual MRP arithmetic processes.

The data managing module (see reference symbol 20 in FIG. 1) for the MRP arithmetic process carried out internally of each processor element is designed to control or manage inputting of data into the memory and outputting of data from the memory. This memory corresponds to the data holding module 21 shown in FIG. 1. Stored in this memory is an item cell 811 in which the parts-table data, the inventory/order balance data are listed on an item-by-item basis.

Further, the arithmetic-susceptible item managing unit— (refer to reference numeral 33 in FIG. 1) which constitutes a part of the MRP arithmetic process 60 includes a job queue 315 for storing starting addresses of the item cells of the arithmetic-susceptible items on a low-level basis and a job counter 314 indicating the number of jobs placed in the low-level-based job queue. Additionally, a level counter 316 indicating the low level being processed is provided in the arithmetic-susceptible item managing unit.

The net required-quantity sending/receiving unit (refer to reference symbol 35 in FIG. 1) included in the MRP arithmetic process 60 is provided with a number of net required quantity carriers 317 each constituted by a send buffer for sending the net required quantity of the parent-item to the MRP arithmetic processes of the other processor elements, respectively, wherein the aforementioned number corresponds to that of the MRP arithmetic processes in the other processor elements.

Before entering into elucidation of the MRP arithmetic system implemented in the structure described above description will be made briefly of an allocation processing which provides the precondition for the operation of the MRP arithmetic system. The allocation processing is executed in precedence to the execution of the MRP arithmetic in order to uniformize the calculation load among the individual processor elements PEs.

More specifically, items are first read out from the items table stored previously in the hard disk of the apparatus, whereon the items to be arithmetically processed by the individual processor elements are allocated to the latter, respectively, which is then followed by generation or creation of a table indicating the ID numbers of the processor elements to which the items are allocated with the item ID numbers being used as the keys. The table mentioned above will be referred to as the items allocation table.

In conjunction with allocation of the items to the individual processor elements, there are available a variety of procedures. The most simple one of these procedures is to allocate sequentially and orderly the items of the parts table to the individual processor elements PEs. By resorting to an appropriate procedure, the processor elements allocated with the items, i.e., the item-allocated processor elements, are determined for all the items, whereon the items allocation table is generated. Subsequently, tables for the data concerning the MPS, a parts arrangement table, the inventory/order balance, etc. are newly created for the individual processor elements, respectively, to be sent to the corresponding processor elements for storage in the hard disks of the processor elements, respectively, whereupon execution of the items allocation procedure comes to an end.

The table for each processor element can be generated or prepared by copying individual records of the items table to the table for the processor element PE by referencing the allocated PE number of the items contained in the records. By way of example, when the arithmetics concerning the items of the ID numbers 1 to 3 contained in the items table 500 is to be executed by the processor element PE0 which the arithmetics concerning the items of the ID numbers 2 and 3 are to be executed by the processor element PE1, the information concerning the item ID numbers 1 and 3 is written in the items table 520 for the processor element PE0, while the information concerning the item ID numbers 2 and 4 are entered in the items table 530 for the processor element PE1.

In particular, when a given item A is allocated to the processor element PE1 upon transfer of the parts arrangement table to the individual processor elements for storage therein, i.e., upon distributive disposition of the parts arrangement table, the parts arrangement table for the processor element PE1 is so prepared that not only the record indicating the parent-child relationship between the item A and the child-item(s) thereof but also the record indicating the parent-child relationship between the item A and the parent-item thereof is contained in the table. Similarly, in the case where the given item A, for example, is allocated to the processor element PE1 upon creation of the items allocation tables for the individual processor elements, respectively, not only the record concerning the item A but also the record(s) concerning the child-item(s) and the parent-item of the item A are contained in the items allocation table for the item A. This is because the information mentioned above is necessary for the part-based expansion arithmetic for the item A. By preparing the tables for the individual processor elements PEs in this manner, the records number can be decreased when compared with the original table, whereby the table read processing to be executed by the MRP arithmetic process, i.e., by the MRP arithmetic apparatus, can be carried out at a high speed, to an advantage. In this conjunction, it should however be mentioned that the original table, i.e., the items table itself may be distributively disposed, as it is, at the individual processor elements, respectively.

Figure 6:
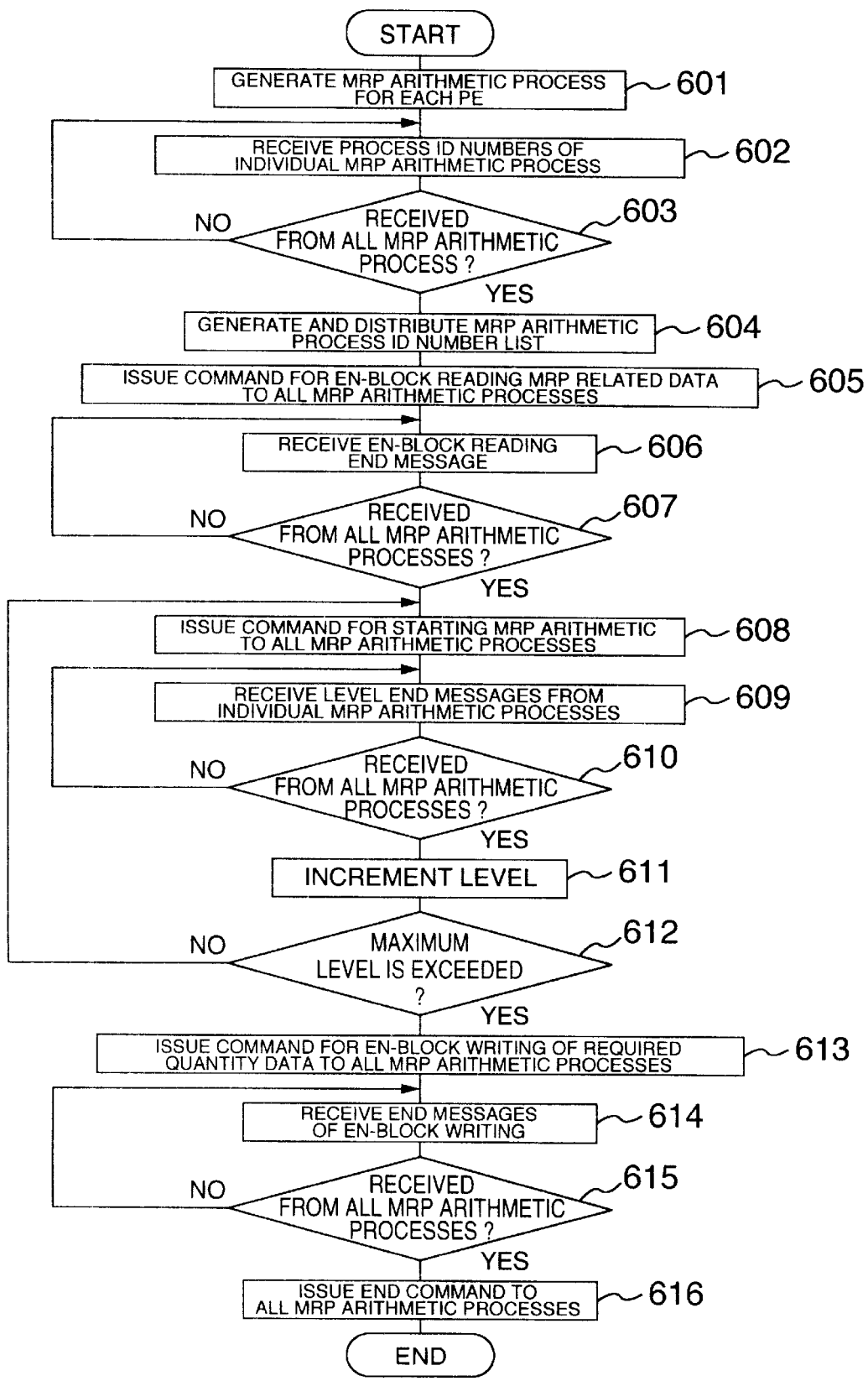
FIG. 6 is a flow chart for illustrating processings executed through a control process according to an embodiment of the present invention.

Next, description will be made in concrete of the processings performed by the MRP arithmetic system implemented in the configuration described above. FIG. 6 is a flow chart f or illustrating processings executed through the control process. At first, the control process 70 creates the MRP arithmetic process in each of the processor elements (step 601) and receives processor element ID numbers and the process ID numbers for the MRP arithmetic processes sent from the MRP arithmetic processes as generated (step 602). Subsequently, decision is made whether or not the information have been received from all the MRP arithmetic processes (step 603). If there exists the MRP arithmetic process from which the aforementioned information has not yet received, the step 602 is resumed.

Upon reception of the processor element ID numbers and the process ID numbers from all the MRP arithmetic processes (i.e., when the step 602 results in affirmation (Yes)), the control process 70 creates or generates a list of the names or IDs of the processor elements in which the MRP arithmetic processes exists, respectively, and the ID numbers of the MRP arithmetic processes, whereon the list table is supplied to all the processor elements to be available for the MRP arithmetic processes thereof (step 604).

The MRP arithmetic process in each of the processor elements generates a demanded quantity carrier and an item cell carrier on the basis of the distributed list table. After the distribution of the list table, the control process 70 issues a command to all the MRP arithmetic processes for reading in batch or en bloc the data of the parts table required for executing the MRP arithmetic (step 605) and waits for an end report indicating the completion of the en-bloc reading by the MRP arithmetic process (step 606).

Upon reception of the end report of the en-block reading from all the MRP arithmetic processes (i.e., when the step 607 results in affirmation (Yes)), the control process 70 commands the MRP arithmetic operation for all the MRP arithmetic processes (step 608) and then waits for level end reports from the MRP arithmetic processes (step 609).

When reception of the level end report is decided in the step 609 and when reception of the level end report concerning the arithmetic-destined items of that level is decided in a step 610, the level is then incremented, whereon the command for execution of the MRP arithmetic for the next level is issued to all the MRP arithmetic processes (step 611). When the MRP arithmetics for all the levels have been completed by executing repetitively the processings of the steps 608 to 611 (i.e., when the step 612 results in affirmation (Yes)), a command for writing en block the required quantity data and the like for the individual items resulting from the MRP arithmetics is issued (step 413) and the en-bloc write operation end report from the MRP arithmetic processes is waited for (step 414).

Upon reception of the en-bloc write operation end reports from all the MRP arithmetic processes (i.e., when the step 615 results in affirmation (Yes)), the control process 70 issues a command for ending the MRP arithmetic to all the MRP arithmetic processes (step 616), whereupon the processings to be performed by the control process 70 comes an end.

Figure 7:
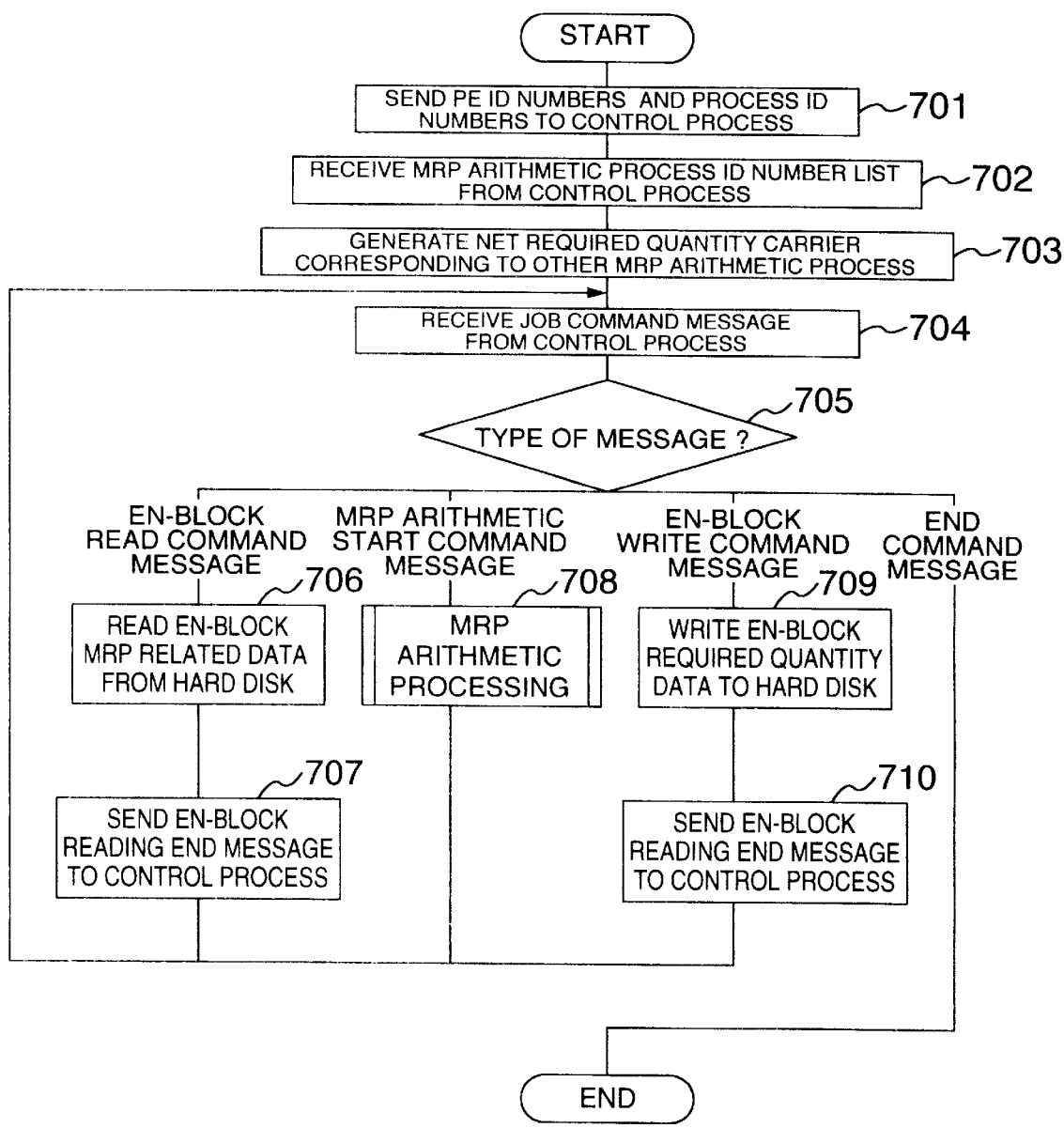
FIG. 7 is a flow chart for illustrating processings performed by an MRP arithmetic process according to an embodiment of the present invention.

Next, description will be made of the processings executed by the MRP arithmetic process resident in the processor element. FIG. 7 is a flow chart f or illustrating processings performed by the MRP arithmetic process. After 1having been generated through the control process (see step 601 shown in FIG. 6), the MRP arithmetic process sends to the control process the ID number of the processor element at which the MRP arithmetic process is disposed (i.e., resident) as well as the process ID number of that MRP arithmetic process (step 701) and receives the MRP arithmetic process ID number list table from the control process (step 702).

Subsequently, the MRP arithmetic process references the list table as received to thereby generate or create the demanded quantity carrier for sending the demanded quantity of the child-item(s) allocated to the other MRP arithmetic processes and the item cell carrier for migrating the load for every one of the other MRP arithmetic processes (step 703). Thereafter, the MRP arithmetic process assumes the state for awaiting reception of a job command message from the control process. Upon reception of the job command message (step 704), the MRP arithmetic process decides the type of the job command message as received (step 705) to thereby execute one of four processings described below in accordance with the message received from the control process.

15 (1) En-bloc Read Processing (Step 706)

The en-bloc read processing is executed in response to the en-bloc read command. By executing the en-bloc read processing, data required for the MRP arithmetic such as the master production schedule or MPS concerning the items as allocated, the parts table and the like are read from the hard disk connected to the processor element, whereon these data are developed on the memory en bloc. In that case, the item cell is generated for each of the allocated items, and the data such as the parts table, inventory/order balance and the like concerning the items are stored in a predetermined data area so as to be contained in the item cell.

Figure 8:
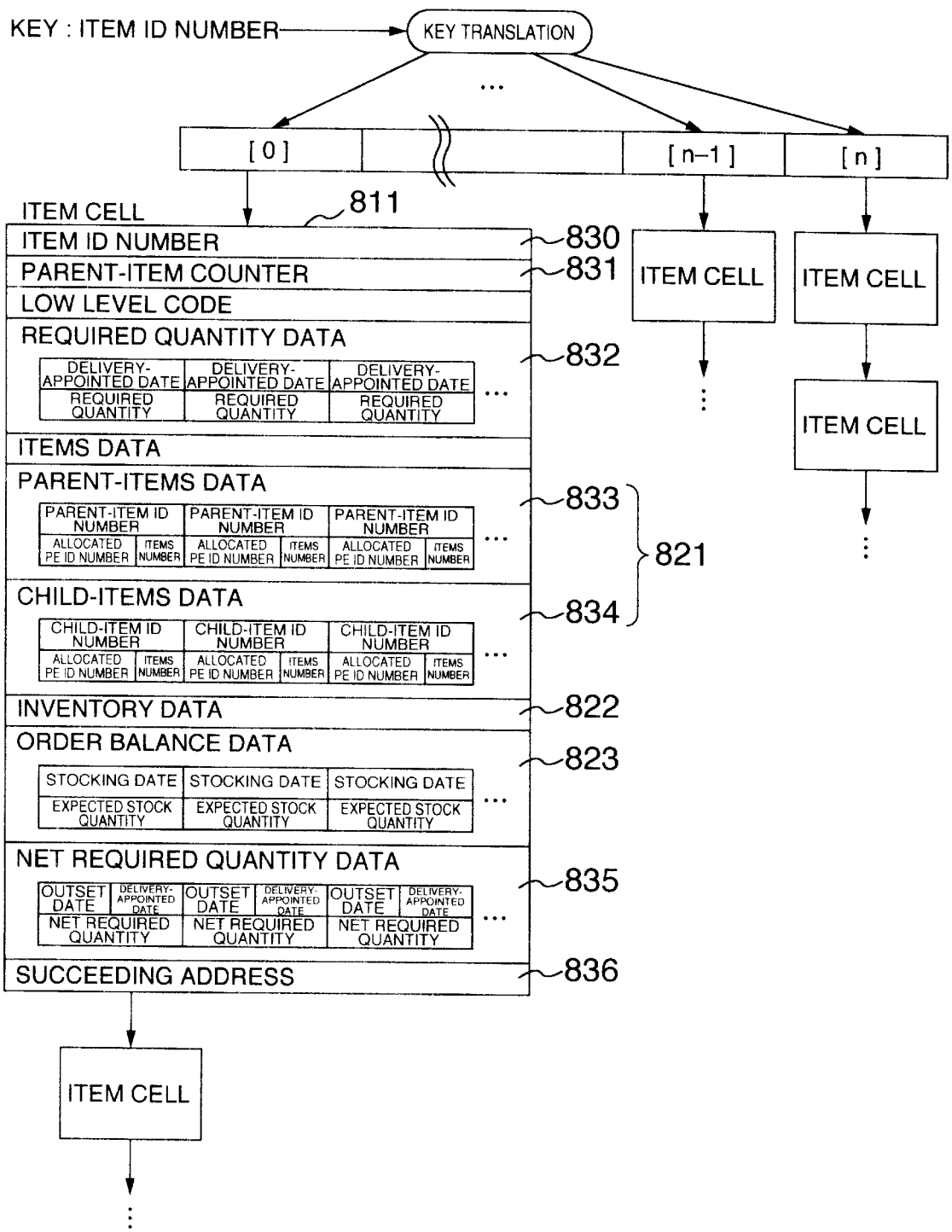
FIG. 8 is a diagram for illustrating a structure of an item cell employed in an embodiment of the present invention.

FIG. 8 is a diagram for illustrating a structure of the item cell. As can be seen in FIG. 8, the item cell 811 is provided with data areas each for storing an item ID number 830, a parent-item counter 831, the low level codes 820, required quantity data 832, items data 821, inventory data 822, order balance data 823, net required quantity data 835 and a succeeding address 836 at which a succeeding item cell is stored. Each of the item cells is stored in a relevant table of Hash tables [0] to [n] obtained by performing the key translation with the Hash function well known in the art by using as the key the item ID number of the item stored in the relevant item cell.

The items data 821 includes parent-item data 833 concerning the parent-items of the concerned item and child-item(s) data 834 concerning the child-item(s) of the concerned item. The parent-item data includes a set of data composed of the parent-item ID numbers, the ID numbers of the corresponding processor elements and the numbers of the parent items as required, while the child-item data includes the ID numbers of the child-items, corresponding processor element ID numbers and the numbers of the child-items as required.

Figure 9:
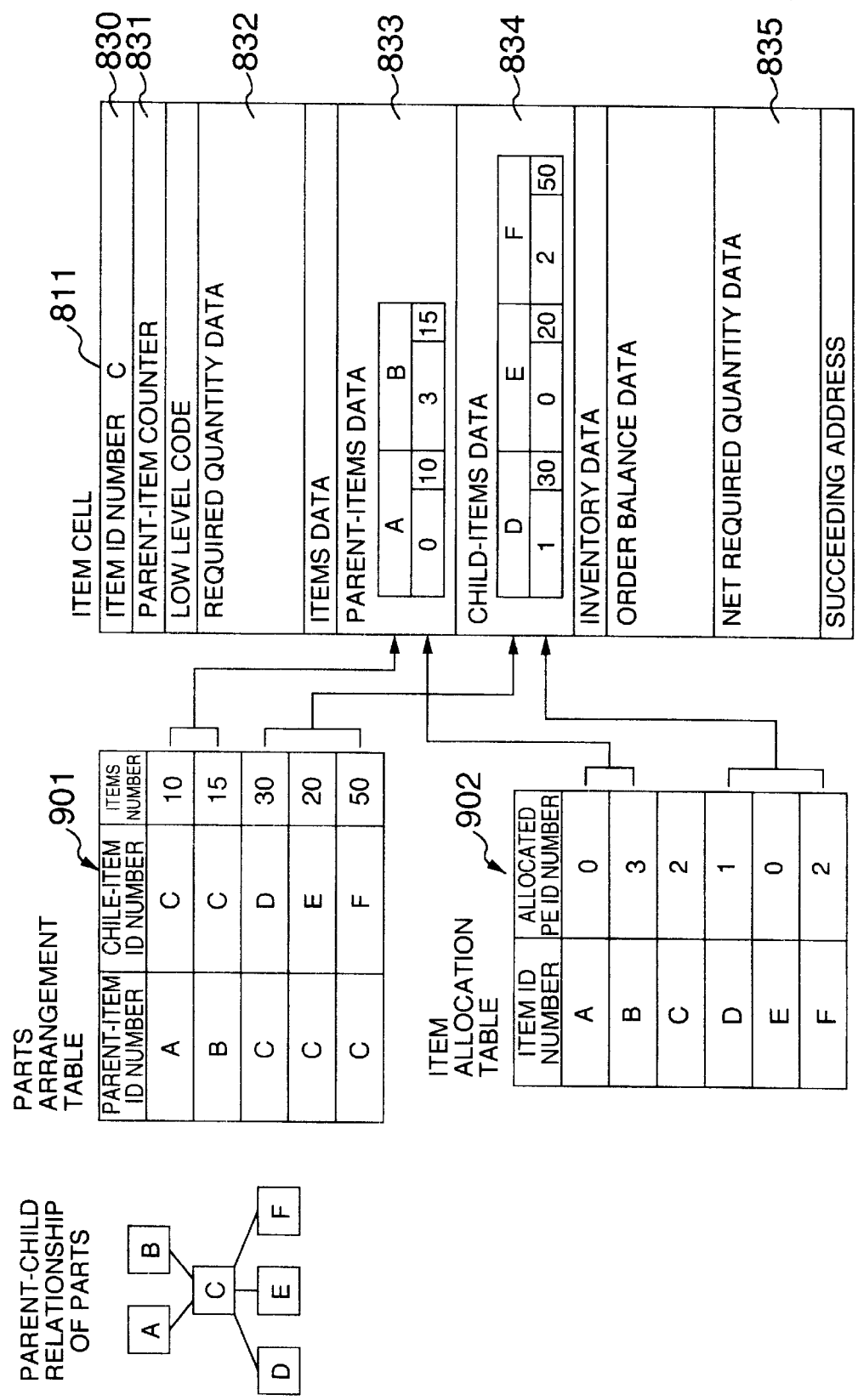
FIG. 9 is a view showing relation between a parts arrangement table and an item cell of the present invention.

As shown in FIG. 9, for generating these items data, the MRP arithmetic process references a parts arrangement table 901 stored in the hard disk connected to the processor element to thereby read the record indicating the parent-child relationship between the item of concern and the child-item thereof, whereon the data concerning the child-item ID number and the number of the child-items are stored in the child-item data column, while the record indicating the parent-child relationship between the item of concern and the parent-item thereof are fetched to thereby store the data indicating the parent-items and the number thereof in the parent-item data column. Furthermore, the MRP arithmetic process references the item allocation table 902 stored in the hard disk connected to the processor element to thereby store the ID numbers of the processor elements allocated to the child-items and the parent-items thereof, i.e., the allocated PE numbers, in relevant columns, respectively. In this conjunction, it should be mentioned that the ID number of the processor elements to which the parent-items are allocated and the numbers of the child-items need not be stored in the relevant columns of the item cell.

Further, the MRP arithmetic apparatus is so arranged as to initialize the level counter and the other various counters to "0" (zero). Subsequently, the MRP arithmetic apparatus fetches the MPS data indicating the production schedule at the article level while enters numerical values as required in the column f or the required quantity data (see reference character 832) At that time 25 point, the item address of the item for which the required quantity data has been entered is registered in the job queue of low level code (see reference numeral 315 shown in FIG. 4) incorporated in the part-based expansion arithmetic unit (see reference numeral 34 in FIG. 1 and FIG. 4), whereon the job counter (see reference numeral 314 in FIG. 4) indicating the number of items registered in the queue provided on a low-level basis is incremented.

Upon completion of the processings described above, the MRP arithmetic process informs the control process of the end of the en-bloc reading operation (step 707), whereupon the step 704 is resumed for waiting the reception of the job command message.

(2) MRP Arithmetic Processing (Step 708)

Figure 10:
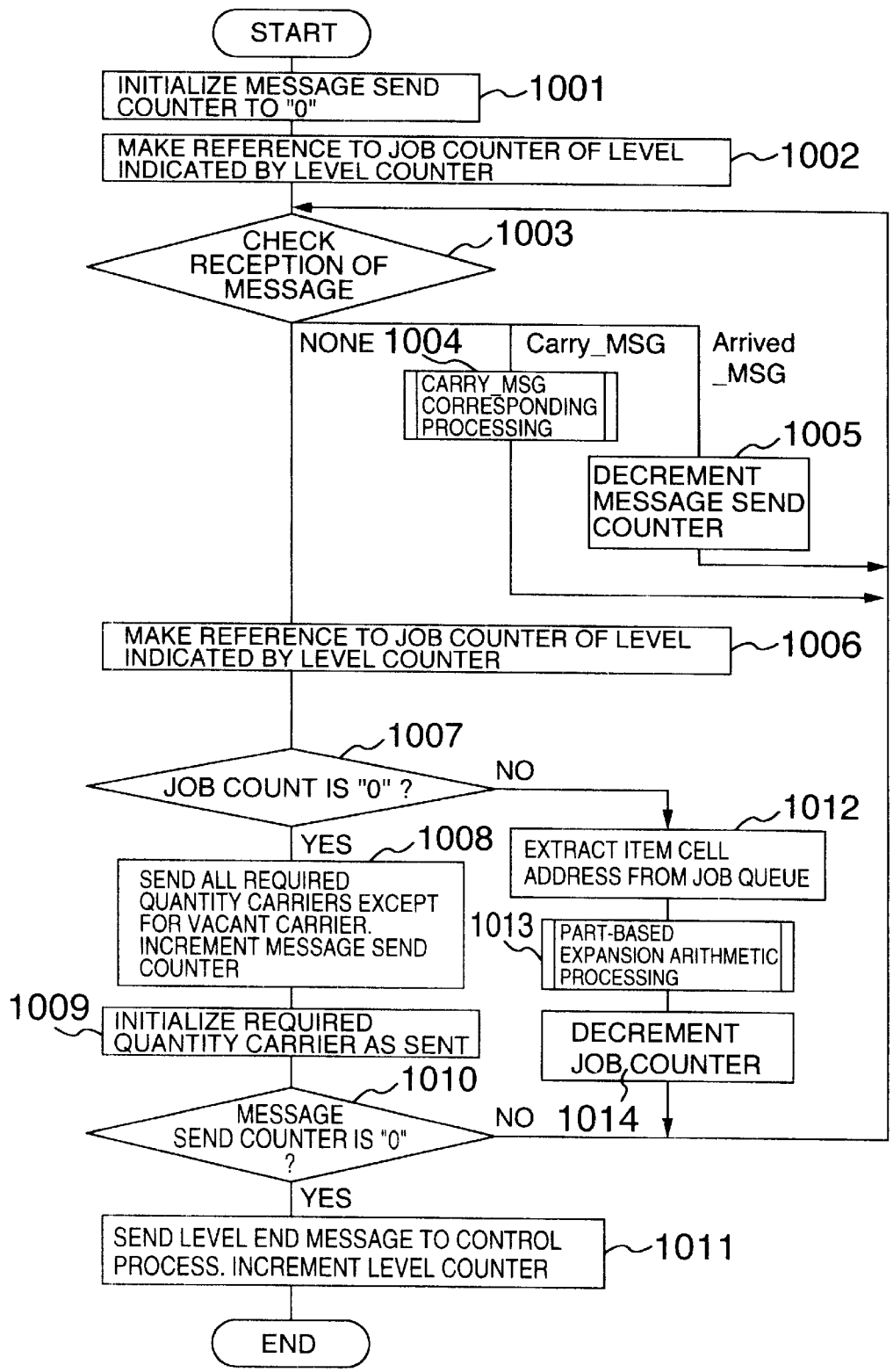
FIG. 10 is a flow chart for illustrating an MRP arithmetic processing according to an embodiment of the present invention.

The MRP arithmetic processing is executed in response to an MRP arithmetic command. FIG. 10 is a flow chart for illustrating the MRP arithmetic processing. In the following, this processing will be elucidated by reference to FIGS. 8 and 10 together with FIG. 11 showing data structures of a job counter and a job queue, respectively.

Figure 11:
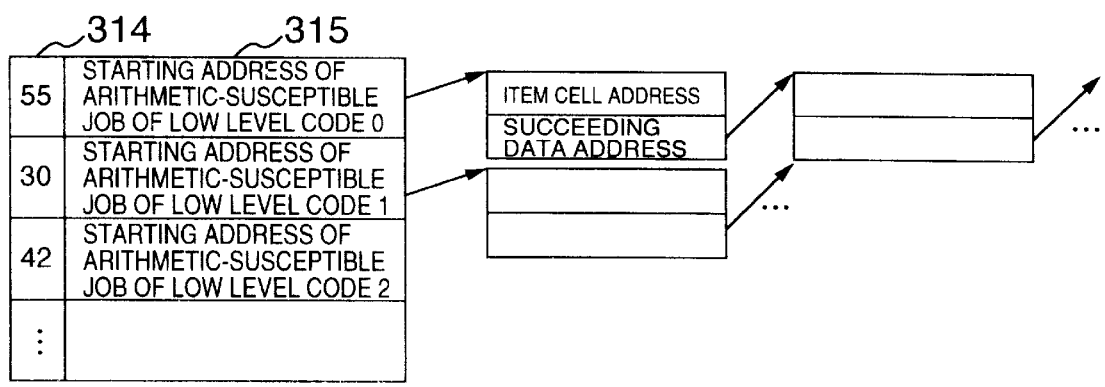
FIG. 11 is a diagram showing data structures of a job counter and a job queue, respectively, according to an embodiment of the present invention.

As can be seen in FIG. 11, a job counter 314 is provided for each level for storing the number of the items susceptible to the arithmetic processing at a given level. By way of example, the number of the items susceptible to the arithmetic operation at the level "0" (zero) is "55" in the case of the example illustrated in FIG. 11. In the job queue 315, there are stored addresses of the item cells held in the data managing unit (see reference numeral 20 in FIG. 1 and FIG. 4). More specifically, the job queue 315 is implemented in a list table structure, as can be seen in FIG. 11, wherein there are stored in the first column or row of the job queue a starting address of the job susceptible to the arithmetic operation at the corresponding level and an address of a succeeding column or row, while at the address of the succeeding column or row, the@e are stored the address of the item cell of the items susceptible to the arithmetic operation in succession at the corresponding level and an address of a further succeeding column or row. In the similar manner, there are stored sequentially in the other columns or rows the item cell addresses of the items susceptible to the arithmetic operation at the corresponding levels and the addresses of the columns or rows which succeed. In this way, the individual columns or rows are interlinked in a chain-like fashion. Thus, by tracing these addresses, it becomes possible to access sequentially the items susceptible to the arithmetic operation at the relevant level.

Referring to FIG. 10, in the MRP arithmetic processing, a message send counter is initialized to "0" (zero) (step 1001) Subsequently, after referencing the job counter of the level indicated by the level counter (step 1002), it is checked what sort of message has been received (step 1003). This message is supplied from the other MRP arithmetic process, as will be described later on.

When the MRP arithmetic process has received Carry-MSG indicating the net required quantity carrier in the step 1003, "Carry-MSG corresponding processing" is executed in a step 1004. Alternatively, when an Arrived MSG indicating that a message as sent has arrived without fail is received, the message send counter is decremented (step 1005). When the processing(s) in the step 1004 and/or 1005 has been executed with all the processings having been completed in response to the message (s) as received, the job counter of the level indicated by the level counter is referenced (step 1006).

Subsequently, decision is made as to whether value of the job counter referenced in the step 1006 is "0" (zero) or not (step 1007) In case the value of the job counter is "0", i.e., when decision in the step 1007 results in affirmation (Yes), destination MRP arithmetic process names are affixed to all the demanded quantity carrier except for the vacant demanded quantity carrier, to thereby generate the Carry-MSGs which are then sent to the other MRP arithmetic processes, whereon the value of the message send counter is incremented by a number of the carriers as sent (step 1008). In succession, the demanded quantity carriers as sent are initialized (step 1009). Incidentally, in the case where all the demanded quantity carriers are vacant or empty, no processings are executed at all in the steps 1008 and 1009.

Thereafter, decision is made as to whether the value of the message send counter is "0" (zero) or not (step 1010). In case the value of the message send counter is "0", i.e., when the step 1010 results in affirmation (Yes), the level end message is issued to the control process and the level counter is incremented (step 1011), whereupon the processing procedure comes to an end. On the contrary, when the step 1010 results in negation (No), the step 1003 is resumed.

When it is decided in the step 1007 that the value of the job counter is not "0", i.e., when this step results in negation (No), the item cell address of the arithmetic-susceptible item is taken out from the job queue (step 1012), which is then followed by execution of the part-based expansion arithmetic processing (step 1013). Subsequently, the value of the job counter is decremented (step 1014), whereupon return is made to the step 1003.

Figure 12:
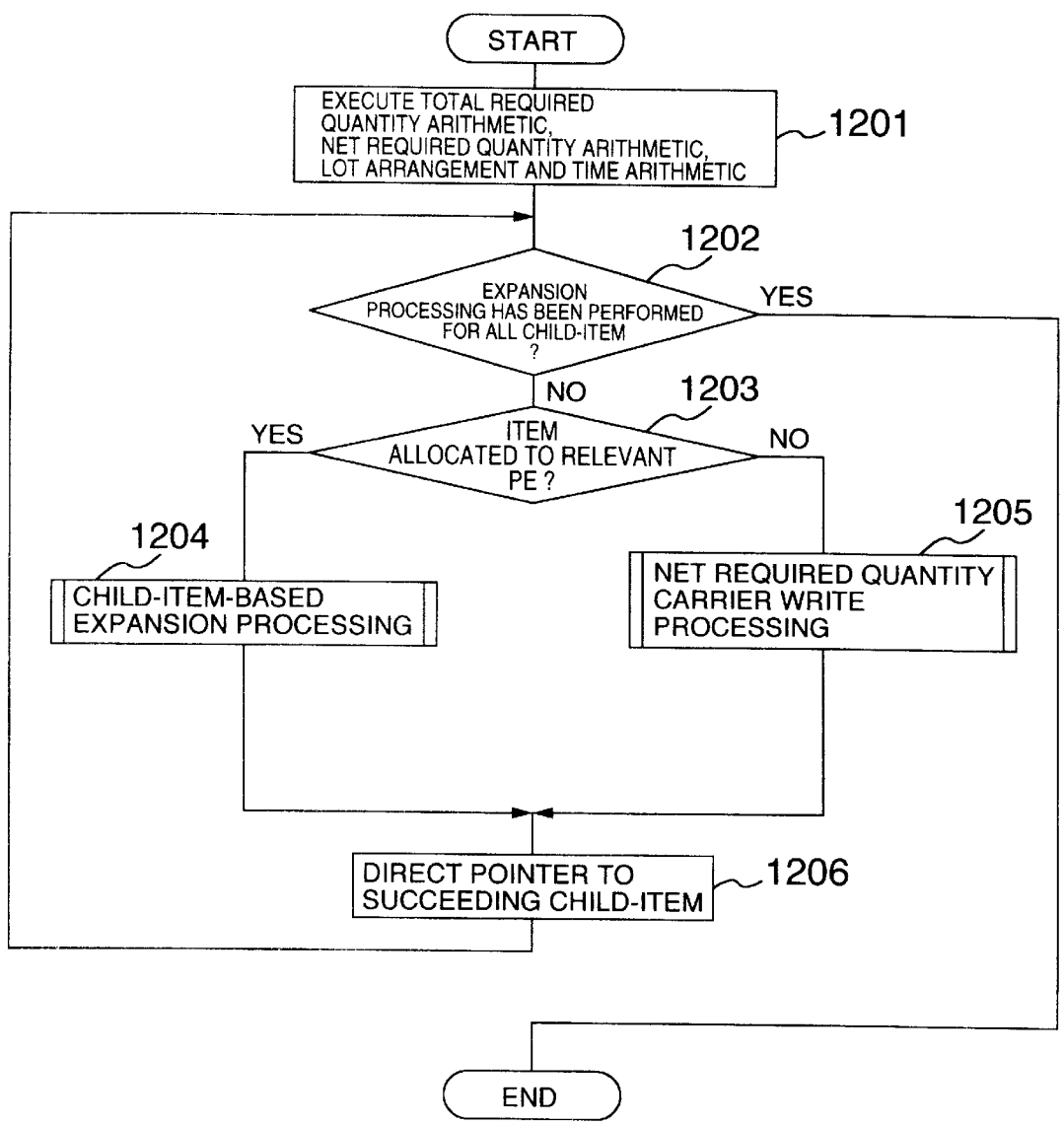
FIG. 12 is a flow chart for illustrating a part-based expansion arithmetic processing according to an embodiment of the present invention.

Now, the part-based expansion arithmetic processing executed in the aforementioned step 1013 will be elucidated by reference to FIG. 12. The part-based expansion arithmetic processing can be realized by executing sequentially the total required quantity arithmetic, the net required quantity arithmetic, the lot arrangement and the lead time arithmetic (all in step 1201) and the required quantity expansion, as in the case of the conventional system. The part-based expansion processing according to the instant embodiment of the invention differs from the hitherto known part-based expansion processing in the respect that processings concerning child-items allocated to a plurality of processor elements are executed by these processor elements. More specifically, as illustrated in FIG. 12, child-items data 834 held in the item cell (see FIG. 8) are referenced sequentially for executing the processings described below. When the allocated PE number for the child-item is same as the ID number of the processor element which is currently executing the processing (i.e., when step 1203 results in affirmation (Yes), the child-item-based expansion processing is executed on the basis of the item ID number 830 held in the item cell (i.e., the processor element's own item ID number), the child-item number contained in the child-item(s) data 834 and the net required quantity data 835 (step 1204), on the contrary, unless the allocated PE number for the child-item is identical with the ID number of the processor element which is executing the processing (i.e., when the step 1204 results in negation (No)), a net required quantity carrier write processing is executed (step 1205). Upon completion of the processing in the step 1204 or the step 1205, the pointer is set to the succeeding child-item. To say in another way, the succeeding child-item is set as the processing-destined object, whereupon return is made to the step 1202. When the processing procedure for all the child-items has been completed by repeating the steps described above (i.e., when the step 1202 results in affirmation (Yes), the part-based expansion arithmetic processing comes to an end.

Figure 13:
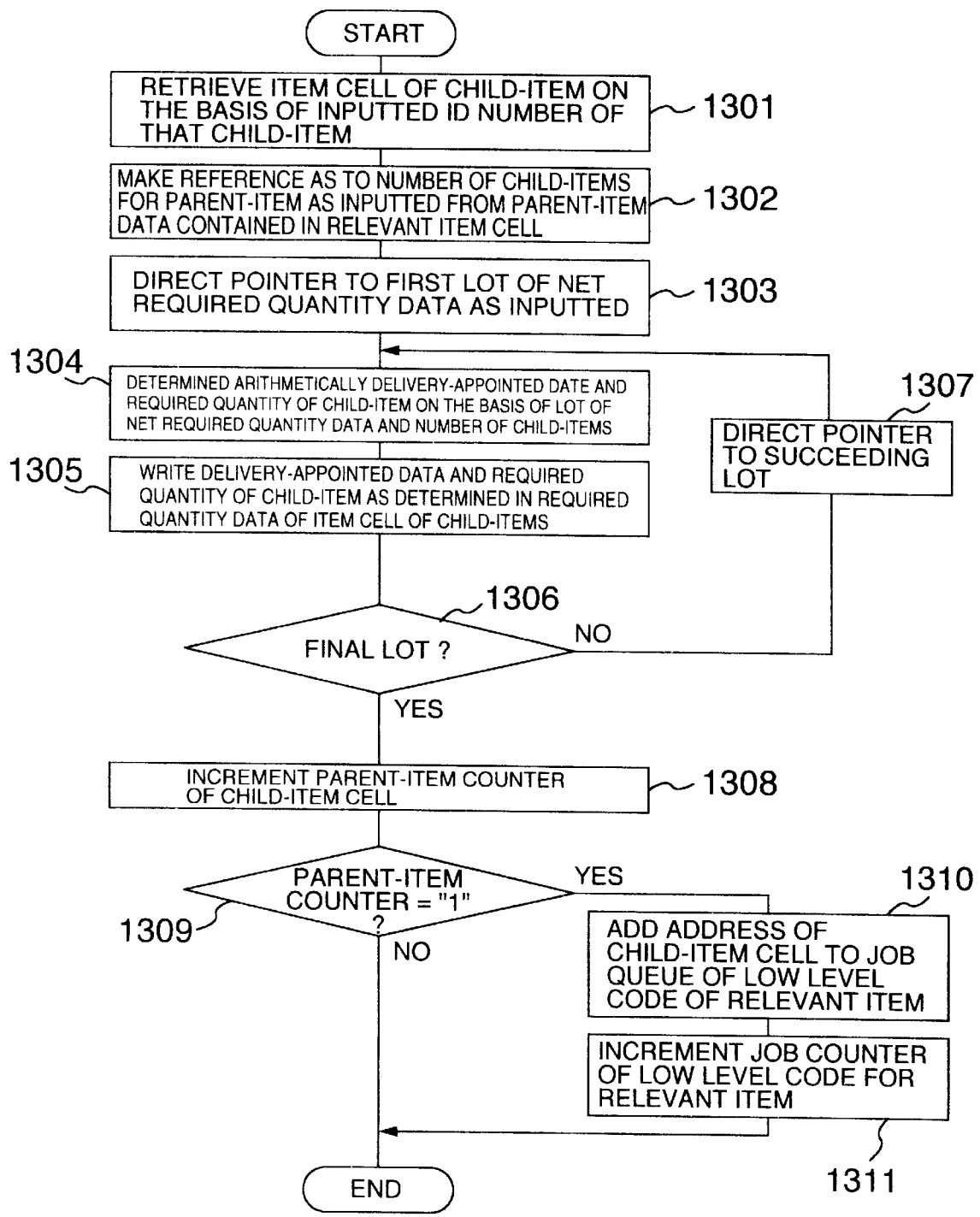
FIG. 13 is a flow chart for illustrating a child-item-based expansion processing according to an embodiment of the present invention.
Figure 15:
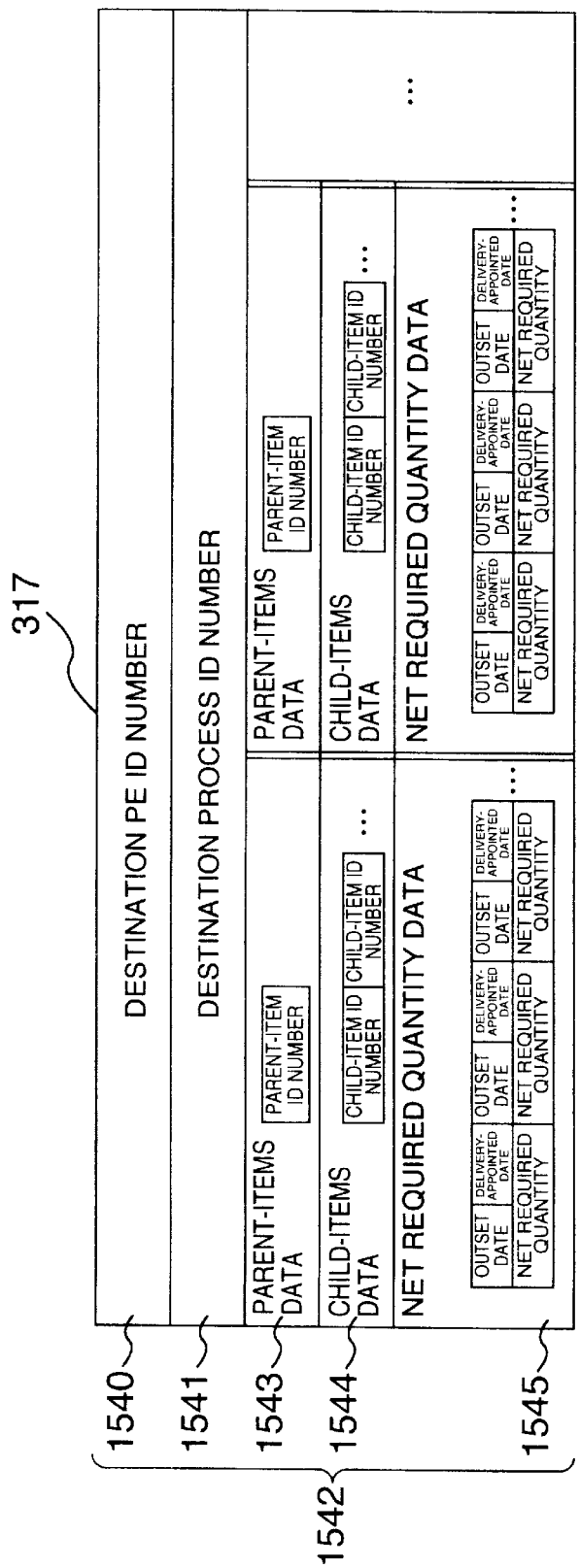
FIG. 15 is a diagram showing a data structure of a net required quantity carrier according to an embodiment of the present invention.

FIG. 13 is a flow chart for illustrating the child-item-based expansion processing. In the child-item-based expansion processing, the processing can proceed with while receiving as input data the parent-item ID number, the child-item ID numbers and the net required quantity data of the parent-item. At this juncture, it should be mentioned that this child-item-based expansion processing is not only executed in response to the step 1204 shown in FIG. 12 but also maybe executed in a processing step 1603 shown in FIG. 16, as described later on. In the first mentioned processing, the net required quantity data contained in the item cell shown in FIG. 8 is used, whereas in the second mentioned processing, the net required quantity data contained in the net required quantity carrier shown in FIG. 15 is employed.

Referring to FIG. 13, the MRP arithmetic process responds to the inputted child-item ID number to thereby find out the item cell of the relevant child-item (step 1301). Subsequently, the MRP arithmetic process makes reference to the number of the child-items for the parent-item in the parent-item data contained in the item cell as found out (step 1302). In succession, the pointer is set to the first lot contained in the net required quantity data (step 1303), whereon the delivery-appointed date and the required quantity of the child-items are arithmetically determined on the basis of the net required quantity data of the relevant lot and the number of the child-items (step 1304), whereon data acquired is stored as the required quantity data of the relevant item cell (step 1305). Parenthetically, with the lot of the net required quantity data, it is contemplated to mean data of a set or combination of the outset date and the net required quantity. By the way, the delivery-appointed date and the required quantity may be arithmetically determined through the conventional procedure known heretofore.

Upon completion of the arithmetic determination of the delivery-appointed dates and the required quantities of the child-items for all the lots through the steps 1306 and 1307 (i.e., when the step 1306 results in affirmation (Yes)), the parent-item counter (see reference numeral 831 in FIG. 8) contained in the item cell is incremented (step 1308). In succession, when the value of the parent-item counter is I'll, (one) (i.e., when the step 1309 results in affirmation (Yes) the address of the item cell is entered or registered in the job queue of the level code of the relevant item (see reference numeral 315 in FIG. 4 and FIG. 11) (step 1310), and the job counter of that level code (see reference numeral 314 in FIG. 4 and FIG. 11) is incremented (step 1311), whereupon the processing comes to an end.

Next, description will be made of a net required quantity carrier write processing by reference to the flow chart shown in FIG. 14. In the net required quantity carrier write processing, the processing can proceed with by using as input data the parent-item ID number, the child-item ID numbers, the child-item allocated PE ID number and the net required quantity data of the parent-item(s). In this processing, only the net required quantity data of the item cell shown in FIG. 8 are made use of.

As described hereinbefore, the net required quantity sending/receiving module of the MRP arithmetic process (denoted by reference numeral 60 in FIG. 4) is provided with the net required quantity carrier 317 which serves as a sending buffer for sending the net required quantity of the parent-item to the MRP arithmetic process(es) of the other processor element(s). FIG. 15 is a diagram showing a data structure of this net required quantity carrier. As can be seen in FIG. 15, the net required quantity carrier 317 includes a column or row 1540 for storing a destination PE ID number, i.e., the ID number of the destination processor element, a column or row 1541 holding a destination process ID number, a parent-item data column or row 1543 containing the parent-item ID number, a child-item data column or row 1544 containing the child-item ID numbers and a column or row 1545 storing the net required quantity data. In the processing illustrated in FIG. 14, the data contained in the net required quantity carrier implemented as described above are written or sent to the MRP arithmetic processes) of the other processor element(s).

Figure 14:
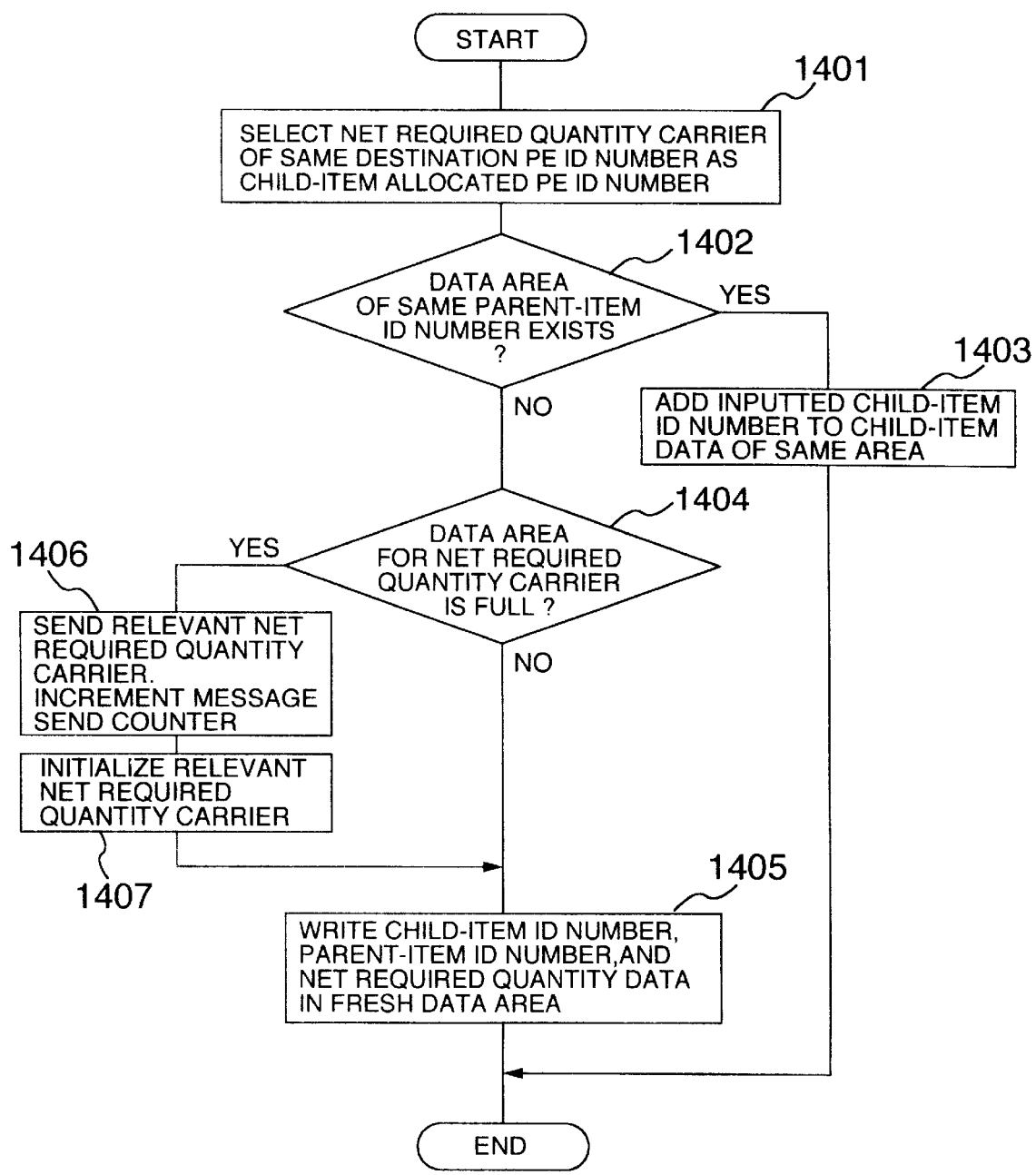
FIG. 14 is a flow chart for illustrating a net required quantity carrier write processing according to an embodiment of the present invention.

As can be seen in FIG. 14, in this processing, the MRP arithmetic process selects the net required quantity carrier 317 having a same destination PE ID number (see reference numeral 1540 in FIG. 15) as the allocated PE ID number for the child-item inputted (step 1401). Subsequently, decision is made as to whether or not the data area 1542 of the same parent-item ID number as the inputted parent-item ID number exists in the selected net required quantity carrier (step 1402) At this juncture, with the data area 1542, it is intended to mean a block of the carrier which contains the parent-item data, the child-item data and the net required quantity data. As shown in FIG. 15, the net required quantity carrier 317 has more than one data area 1542. At this juncture, it should also be mentioned that although only one parent-item ID number is stored in the parent-item data column or row 1543, there may arise the case in which a plurality of child-item ID numbers are stored in the child-items data column or row 1544. When the data area 1542 for the same parent-item ID number as the inputted parent-item ID number exists (i.e., when the step 1402 results in affirmation (Yes)), the given or supplied child-item ID number is additionally entered in the child-items data column or row 1544 of the above-mentioned data area (step 1403), whereupon the processing comes to an end.

On the other hand, when the step 1402 results in negation (No), a fresh data area 1542 is secured, whereon the parent-item ID number, the child-item ID number, and the net required quantity data as inputted are all written in that data area 1542 (step 1405). Incidentally, when the net required quantity carrier 317 is fully occupied and no fresh data area 1542 is available (i.e., when the step 1404 results in negation (No)), the net required quantity carrier 317 mentioned above is sent to the MRP arithmetic process of the relevant processor element by way of the message managing unit 36 and at the same time, the message send counter is incremented (step 1406). After sending of the net required quantity carrier 317, it is initialized (step 1407). Thereafter, a fresh data area is secured for writing therein the parent-item ID number, the child-item number and the net required quantity data as inputted (step 1405).

Figure 16:
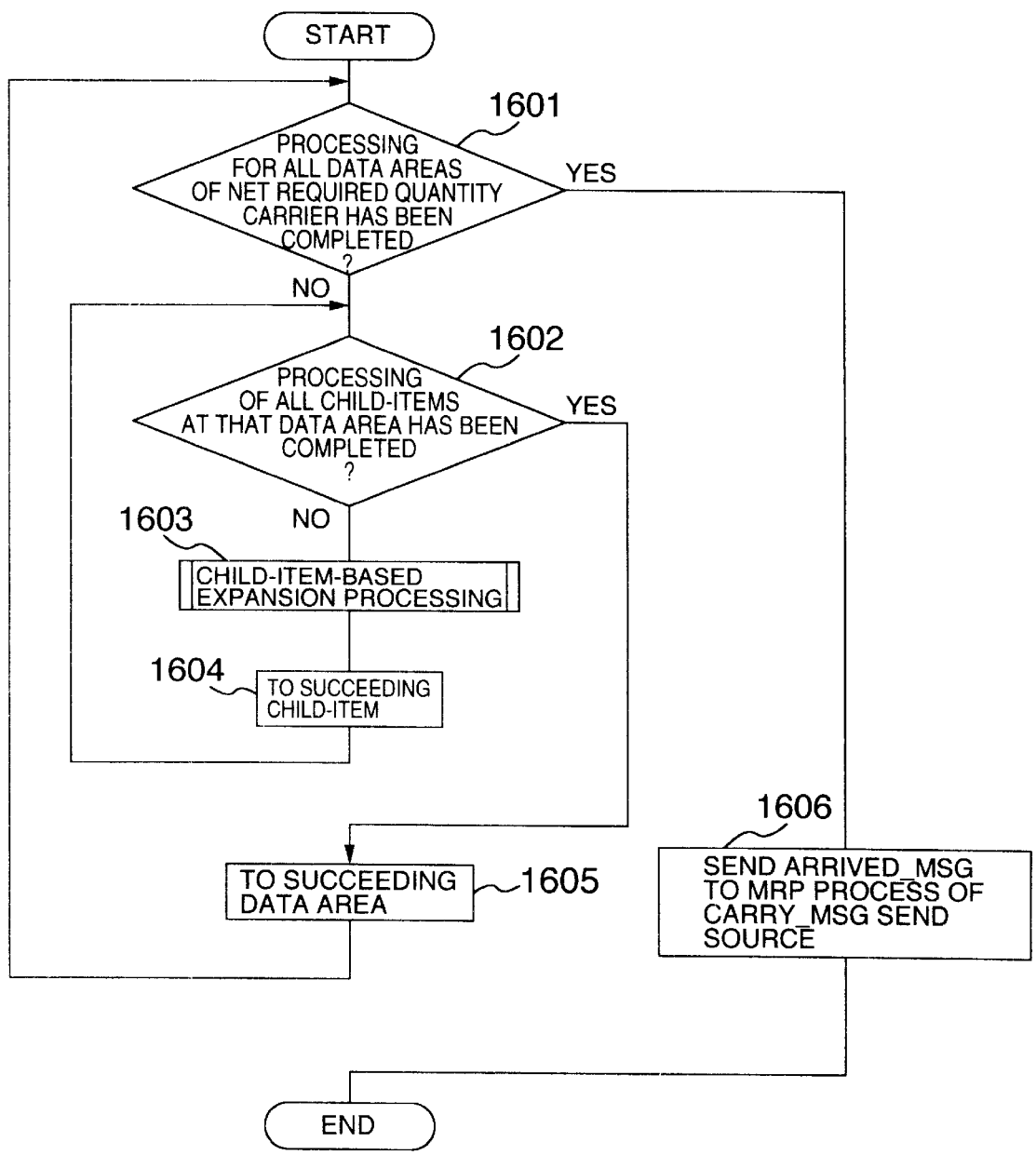
FIG. 16 is a flow chart for illustrating a Carry-MSG corresponding processing according to an embodiment of the present invention.
Figure 17:
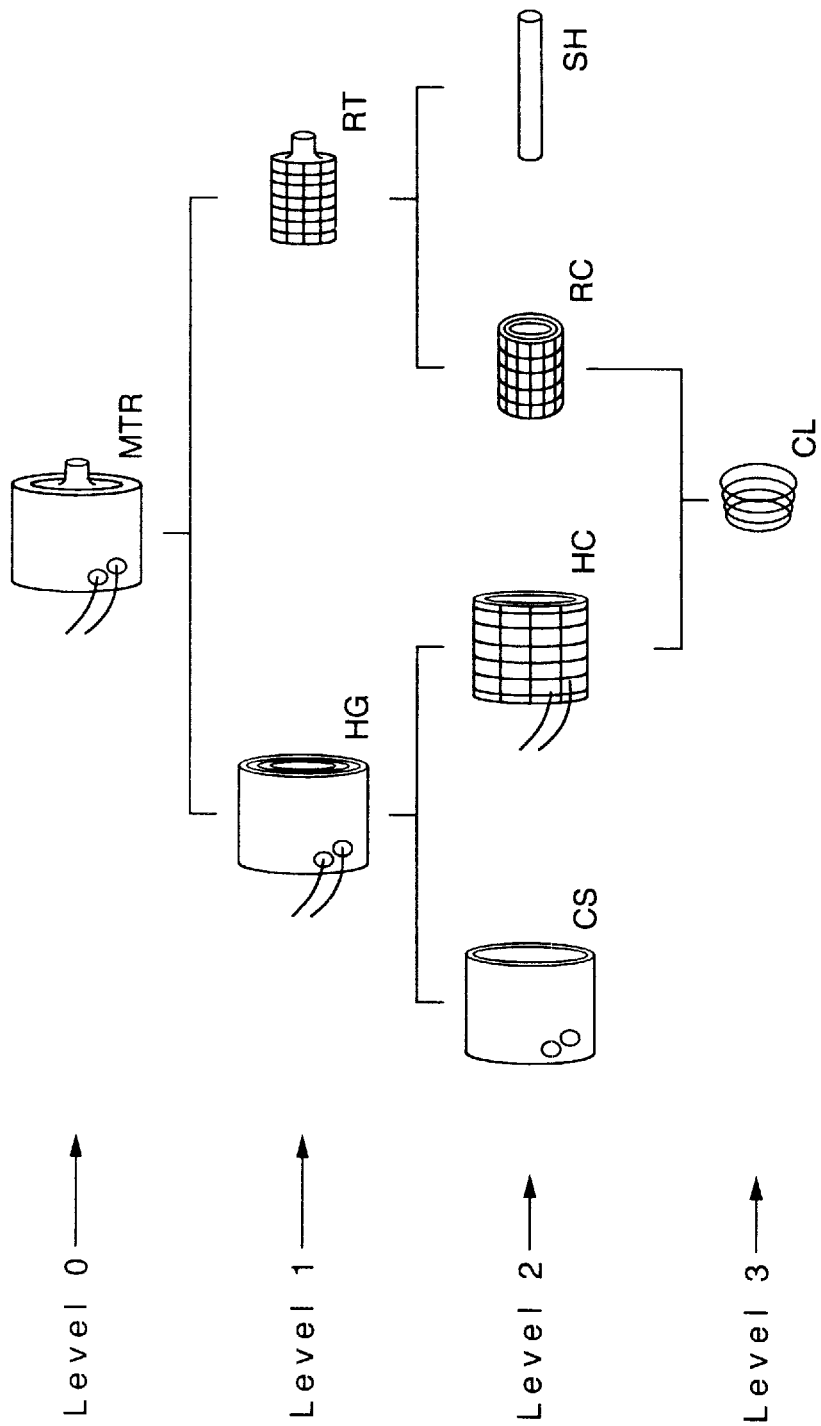
FIG. 17 is a view for illustrating a low level code.

Next, the Carry_MSG corresponding processing in the step 1004 shown in FIG. 10 will be elucidated by reference to FIGS. 8 and 15 and FIG. 16 which shows a flow chart for illustrating the Carry_MSG processing.

In the Carry_MSG processing, the data area 1542 of the net required quantity carriers 317 received from the MRP arithmetic processes of the other processor elements are sequentially selected one by one, while the child-item ID numbers stored in the child-items data columns or rows 1544 of the selected data area 1542 are sequentially selected one by one, whereon the child-items-based expansion processing is executed on the basis of the input data concerning the parent-item ID number contained in the data area 1542, the selected child-item ID number and the net required quantity data (steps 1601 to 1603). This child-items-based expansion processing is same as that described hereinbefore by reference to FIG. 12.

After completion of the child-items-based expansion processings for all the child-items affixed with the child-item ID numbers and contained in the child-items data column or row 1544 (see step 1602 and step 1604), similar processing is executed repetitively for the succeeding data area (refer to step 1601 and step 1605).

After completion of the processing for all the data areas 1542 contained in the received net required quantity carrier 317, the Arrived_MSG is sent to the MRP arithmetic process of the net required quantity carrier send source (step 1606), whereupon the processing procedure comes to an end.

Next, description will further be made of the other processings (en-bloc write processing and end processing) illustrated in FIG. 7.

(3) En-bloc Write Processing (Step 709 and Step 710 in FIG. 7)

In the en-bloc write processing, the required quantity data of the individual items resulting from the MRP arithmetic as developed on the memory are written in the hard disk en bloc (step 709). After the write operation, the MRP arithmetic process informs the control process of completion of the en-bloc write operation (step 710), and the MRP arithmetic process is set to the state waiting for reception of a further job command message.

(4) End Processing

In this processing, the end processing of the MRP arithmetic process is executed.

According to the teachings of the invention incarnated in the instant embodiment, in the child-items-based expansion modules implemented in the individual MRP arithmetic apparatuses 10, respectively, the child-item-based expansion as required is executed on the basis of the net required quantity data and the like. Thus, the load imposed on the MRP arithmetic apparatus designed to execute the processing concerning the parent-item(s) can be mitigated, while overhead involved in the data transfer can be reduced.

The present invention is never restricted to the exemplary embodiments or implementation modes described above but numerous modifications are conceivable without departing from the scope of the invention set forth in claims. It goes without saying that these modifications or alternations fall within the scope of the present invention.

By way of example, in the embodiments or implementation modes described above, it has been assumed that the present invention is applied to the distributed memory type parallel computer. However, the invention is never restricted to the distributed memory type parallel computer. In other words, the present invention can find application not only to the shared memory type parallel computer but also the single-CPU computer.

Besides, the term "means" used in the instant specification does not always mean physical means but encompasses the arrangements in which the functions of the individual means can be realized softwarewise. Besides, it is contemplated that realization of a function of a single means or element may be realized by two or more physical means or members within the purview of the present invention. Similarly, the function implemented by two or more means or members can be realized by a single means or member without departing from the scope of the invention.

According to the present invention, the part-based expansion arithmetics for individual items can be performed concurrently by a plurality of MRP arithmetic apparatuses, whereby load balance among the MRP arithmetic apparatuses can be improved. Besides, the amount of data transferred among the MRP arithmetic apparatuses can be reduced. Thus, the results of arithmetic determination equivalent to the conventional serial algorithm can be obtained within a shortened time period.

By virtue of the features mentioned above, events of changes or alternation occurring in conjunction with business, design, material, field works on a day-by-day basis can be reflected substantially instantaneously to the production schedule, whereby problems brought about by the changes or alteration such as mentioned above can be extracted with the measures for coping with the problems being taken speedily.

In other words, according to the present invention, the load occurring in execution of the arithmetic operations or calculations can be uniformized with overhead being suppressed to a possible minimum, whereby there can be provided the material/quantity requirements arithmetic determination system which can enjoy an enhanced processing speed.

What is claimed is:

1. A material/quantity requirements arithmetic determination system comprising:
   a plurality of arithmetic means for determining arithmetically types of items, quantities thereof and time points at which said items are required, respectively, for manufacturing an article,
   wherein said material/quantity requirements arithmetic determination includes a processing for arithmetically determining a net required quantity of an item constituting said article, and a processing for executing a child-item-based expansion for a child-item by using the net required quantity when said article is constituted by child-items,
   wherein a first arithmetic means of said plurality of arithmetic means comprises:
      means for arithmetically determining said net required quantity of said article, and
      means for outputting said net required quantity determined arithmetically to another one of said plurality of arithmetic means,
   wherein said another one of said plurality of arithmetic means comprises:
      means for executing child-item-based expansion of an item allocated to said another one of said plurality of arithmetic means by using the net required quantity output from said first arithmetic means, and
      means for arithmetically determining a net required quantity of the item undergone said child-item-based expansion.

2. A material/quantity requirements arithmetic determination system according to claim 1, wherein said another one of said plurality of arithmetic means further comprises:
   data holding means for storing data concerning items which said article has;
   arithmetic-susceptible item extracting means for extracting child-items which are susceptible to Material Requirements Planning (MRP) arithmetic;
   child-item expanding means for executing child-item-based expansion for the allocated item based on a net required quantity as given;
   arithmetic-susceptible item managing means for applying to a part-based expansion arithmetic means data concerning the child-items extracted through said arithmetic-susceptible item extracting means, and
   said part-based expansion arithmetic means for receiving data concerning said child-items to execute part-based expansion arithmetic for said child-items.

3. A material/quantity requirements arithmetic determination system according to claim 2, wherein said plurality of arithmetic means are so arranged as to execute in parallel the arithmetics concerning the items for which low level codes representative of level codes of hierarchically lowest rank among those indicating hierarchical levels to which the items constituting the article to be manufactured belong are same.

4. A material/quantity requirements arithmetic determination system according to claim 1, wherein said plurality of arithmetic means are so arranged as to execute in parallel the arithmetics concerning the items for which low level codes representative of level codes of hierarchically lowest rank among those indicating hierarchical levels to which the items constituting the article to be manufactured belong are same.

5. A material/quantity requirements arithmetic determination method for determining arithmetically types of items, quantities thereof and delivery-appointed terms thereof which are required for manufacturing a predetermined article based on a production schedule of said article with the aid of a plurality of arithmetic means, wherein said material/quantity requirements arithmetic determination includes a processing for arithmetically determining a net required quantity of an item constituting said article, a processing for executing a child-item-based expansion for a child-item by using the net required quantity when said article is constituted by child-items, said method comprising:
   arithmetically determining said net required quantity of said article with a first arithmetic means of said plurality of arithmetic means;

outputting said net required quantity determined arithmetically to another one of said plurality of arithmetic means;

executing child-item-based expansion of an item allocated to said another one of said plurality of arithmetic means by said another one of said plurality of arithmetic means by using the net required quantity output from said first arithmetic means; and arithmetically determining a net required quantity of the item undergone said child-item-based expansion.

6. A computer-readable recording medium storing a program of a material/quantity requirements arithmetic determination method for determining arithmetically types of items, quantities thereof and delivery-appointed terms thereof which are required for manufacturing a predetermined article based on a production schedule of said article with the aid of a plurality of arithmetic means, wherein said material/quantity requirements arithmetic determination includes a processing for arithmetically determining a net required quantity of an item constituting said article, a processing for executing a child-item-based expansion for a child-item by using the net required quantity when said article is constituted by child-items, said material/quantity requirements arithmetic determination method when executed by a computer causes the computer to perform said method comprising:

arithmetically determining said net required quantity of said article with a first arithmetic means of said plurality of arithmetic means;

outputting said net required quantity determined arithmetically to another one of said plurality of arithmetic means;

executing child-item-based expansion of an item allocated to said another one of said plurality of arithmetic means by said another one of said plurality of arithmetic means by using the net required quantity output from said first arithmetic means; and arithmetically determining a net required quantity of the item undergone said child-item-based expansion.

7. A material/quantity requirements arithmetic determination system comprising:

a plurality of Material Requirements Planning (MRP) arithmetic means for arithmetically determining at least items constituting an article to be manufactured and required quantities of said items, respectively, based on a production schedule of said article, wherein said MRP arithmetic includes a processing for executing the arithmetic determination of an item constituting said article, and a processing for executing a child-item-based expansion for a child item when said article is constituted by child-items, wherein said system is arranged such that said items constituting said article to be arithmetically determined are allocated to said plurality of MRP arithmetic means, respectively, which then perform child-item-based expansion arithmetics for the allocated items, respectively.

8. A material/quantity requirements arithmetic determination system according to claim 7, wherein a first arithmetic means of said plurality of MRP arithmetic means is arranged to send a net required quantity determined arithmetically to another arithmetic means of said plurality of MRP arithmetic means.

\* \* \* \* \*